INVENTOR.
PETER LEFFERTS
BY
MORGAN, FINNEGAN, DURHAM & PINE
ATTORNEYS

INVENTOR.
PETER LEFFERTS
BY
MORGAN, FINNEGAN, DURHAM & PINE
ATTORNEYS

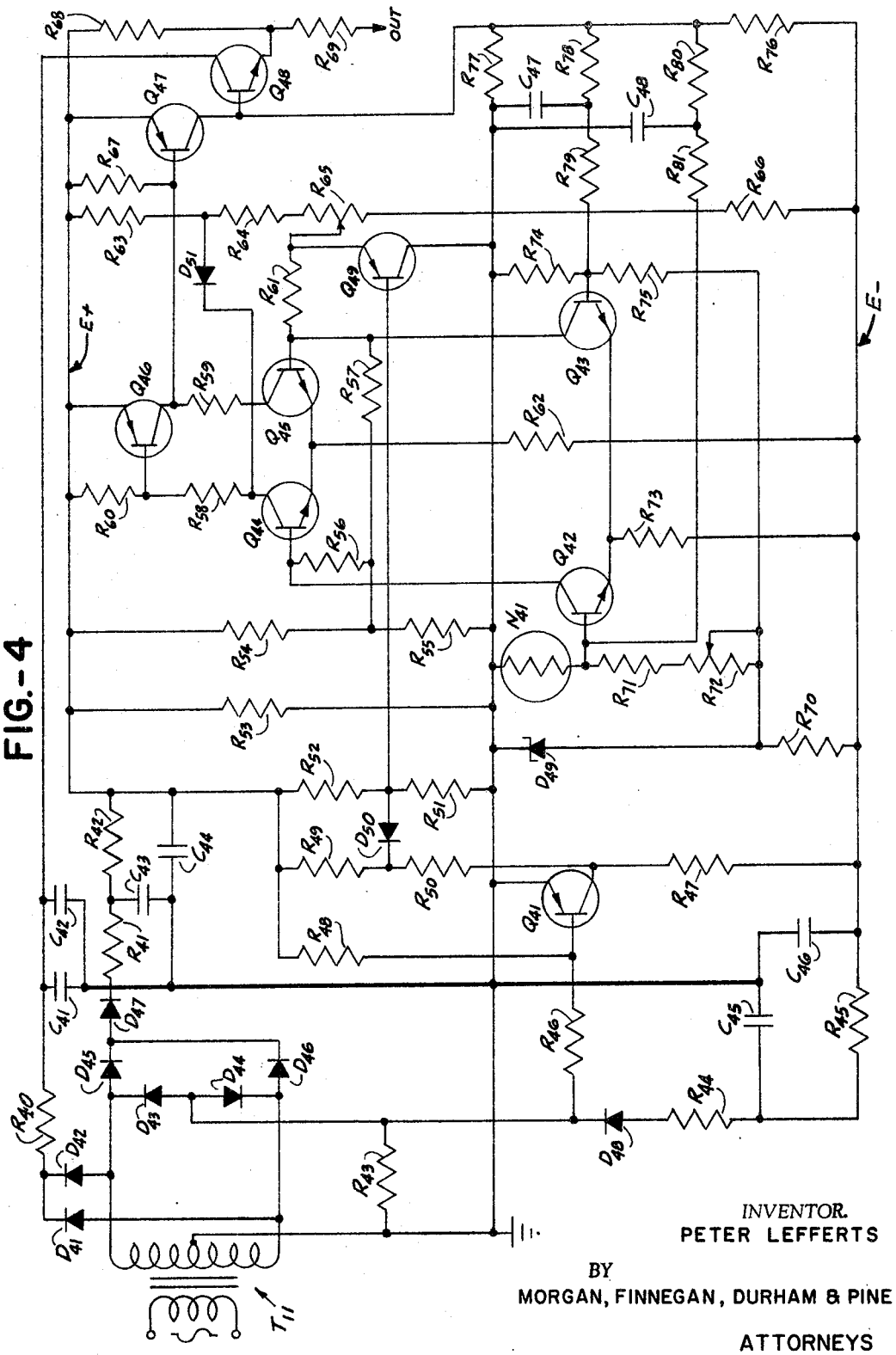

United States Patent Office 3,264,573
Patented August 2, 1966

3,264,573
TRANSIENTLY REGENERATIVE AMPLIFIERS WITH RESPONSE CONTROLLING MEANS
Peter Lefferts, Princeton, N.J., assignor, by mesne assignments to TIA Electric Company, Laurence Township, N.J., a corporation of New Jersey
Filed Jan. 24, 1964, Ser. No. 340,066
31 Claims. (Cl. 330—26)

This application is a continuation in part of applicant's prior copending application, Serial Number 258,811 now abandoned, for Transiently Regenerative Amplifiers With Response Controlling Means, filed February 15, 1963 and assigned to the assignee of the instant application. Related subject matter is also found in applicant's prior copending application, Serial Number 258,735 for Transiently Regenerative Amplification, filed February 15, 1963 and also assigned to the assignee of the instant application.

This invention relates to feedback circuits employed with electronic devices and more particularly to stored feedback circuits employed with transiently regenerative amplifiers.

Transiently regenerative amplifiers such as those disclosed in applicant's above-noted copending application, Serial Number 258,735, may be employed in a variety of applications including those calling for a switched output in response to an extremely low-level input signal. These regenerative amplifiers are subject to a regeneration control wherein the regenerative function is alternately activated and disabled independently of the input signal, and at a rate high with respect to the input signal frequency. During the periods of activated regeneration, the input signal is incrementally sensed whereby the amplifier output attains one of two regenerated states according to the polarity of the input signal.

The transiently regenerative amplifier is extremely sensitive and for many applications it is desirable to reduce this high gain momentarily and at desired intervals. Such a modification of the response of the transiently regenerative amplifier has many uses such as limiting the effects of noise and spurious transients, and stabilizing the operation of the amplifier.

In addition, it is often desirable to bias the input circuit of a transiently regenerative amplifier in a desired direction and over a period of time with respect to the last regeneration of said amplifier to impart characteristics thereto giving rise to various modes of operation such as periodic cycling.

Thus, it is possible to control the response or the characteristics of a transiently regenerative amplifier by means of time-varied reference levels supplied to the input circuit from feedback circuits, the feedback being stored, delayed and phased with respect to the input signal according to the requisites of the application.

The in-phase stored feedback circuits may be adapted to impart characteristics such as input sensitivity limitation and switching stability.

The out-of-phase stored feedback circuits may impart characteristics such as cycling, linear operation and cancellation or reduction of latching tendencies.

Accordingly, it is an object of this invention to provide flexible and economical means for controlling the characteristics of a transiently regenerative amplifier thereby adapting said amplifier to a multiplicity of varied applications.

Another object of this invention is to provide means for varying the gain of a transiently regenerative amplifier over a selected period of time by means that transiently bias the input circuit.

Another object of this invention is to provide simple and flexible time-controllable and amplitude-controllable feedback means for controlling the input circuit of a transiently regenerative amplifier, so as to produce desired response characteristics.

A still further object of the invention is to provide feedback control means in transiently regenerative amplifiers for achieving phase sensitivity.

Another object of this invention is to limit the sensitivity of a transiently regenerative amplifier over a selected period of time thus reducing the effects of noise and spurious transients.

Another object of this invention is to provide means for biasing the input circuit in aiding relationship to the preceding input signal thereby imparting a latching characteristic to the transiently regenerative amplifier.

Yet another object of this invention is to provide delayed feedback means opposing a latching bias so as to override said bias at a determinable instant in time whereby the transiently regenerative amplifier is restored to full sensitivity.

Another object of this invention is to provide means for producing a switching duty cycle within a transiently regenerative amplifier which is variably controllable by the input signal.

An additional object of the invention is to provide means for providing a linear response characteristic in transiently regenerative amplifiers.

Another object of this invention is to provide means for generating a variable duty cycle output of a transiently regenerative amplifier suitable for conversion to a linear output.

A still further object of the invention is to provide in transiently regenerative amplifiers means for combining positive and negative feedback signals in various proportions and according to various time relationships to impart desired response characteristics thereto.

These and other objects and advantages of the invention will be set forth in part hereinafter and in part will be obvious herefrom, or may be learned by practice with the invention, the same being realized and attained by means of the instrumentalities, combinations and improvements pointed out in the appended claims.

FIGURE 4 is a schematic diagram of a transiently regenerative amplifier employing in-phase stored feedback and out-of-phase stored feedback and including temperature sensitive means and preamplifier means;

FIGURE 1 illustrates a circuit disclosed in FIGURE 9 of the applicant's aforementioned copending application, Serial Number 258,735, differing by the addition herein of the elements and connections shown in bold outline. The circuit connections and operation common to both applications are described below.

Figure 1:
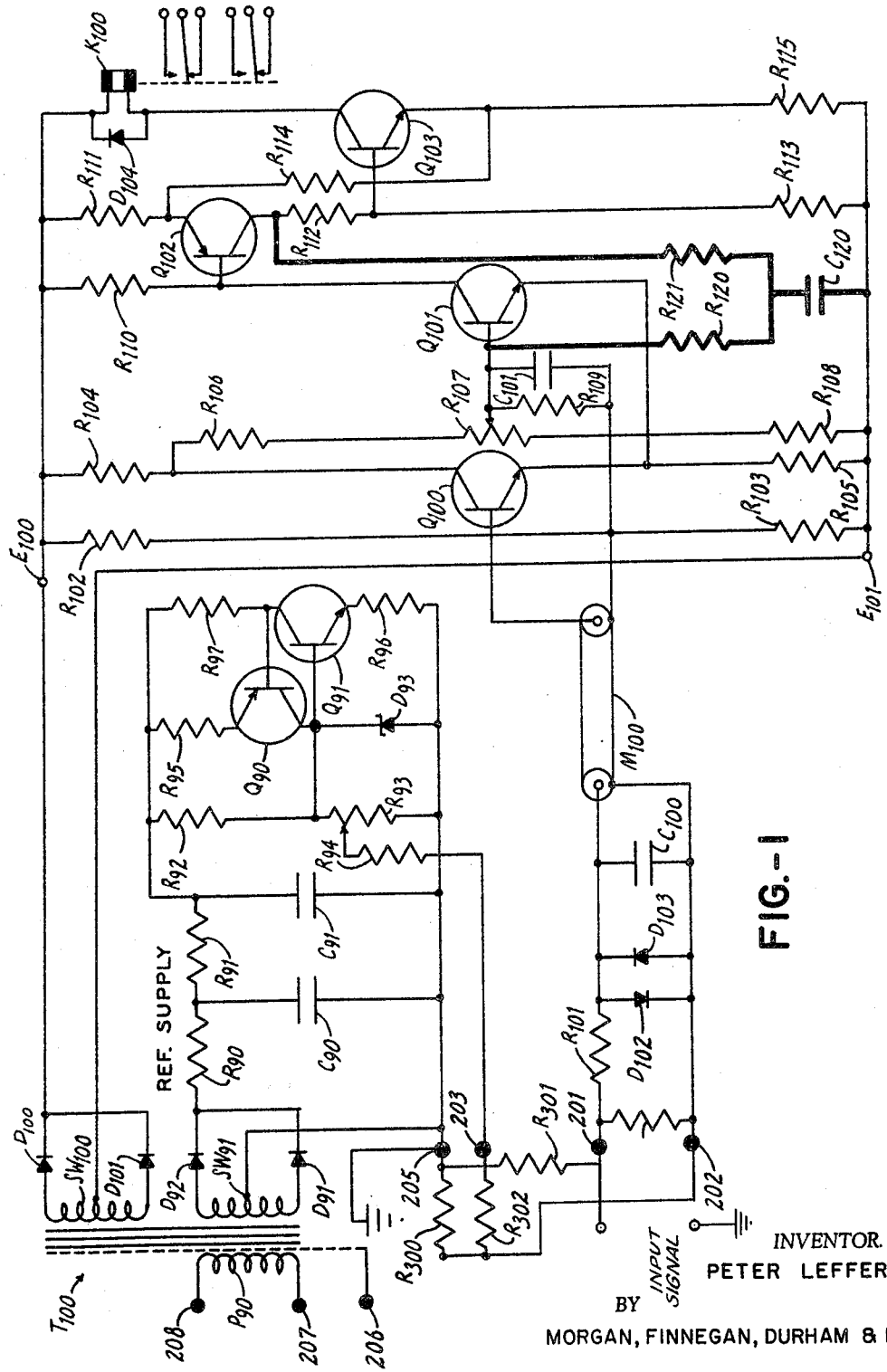
FIGURE 1 is a schematic diagram of a transiently regenerative amplifier employing in-phase stored feedback.

The circuit shown to the left of the terminals 201 through 205 illustrates external connections and resistances which are arranged and adjusted according to the intended application. In the illustrated embodiment the resistors 300, 301 and 302 have been interconnected with the terminals 201, 202, 203 and 205 in order to provide sensitive relay type operation.

Terminals 201 and 202 constitute the input terminals. Terminals 203 and 205 conveniently provide reference potentials derived from a reference supply ("Ref. Supply") included in the unit to impart versatility thereto and facilitate a wide variety of applications. The voltage at terminal 203 is adjustable while the voltage at terminal 205 is fixed. Input power is supplied at terminals 207 and 208, being fed from the available power source. The output circuit comprises a relay $K_{100}$ and associated contacts, the latter opening and closing according to the amplitude of the input signal.

The reference supply comprises a full wave rectifier including a secondary winding $SW_{91}$ of a transformer $T_{100}$ and, diodes $D_{91}$ and $D_{92}$. The transformer is energized by way of primary winding $P_{90}$.

Connected across the output terminals of the rectifier in the reference supply is the series combination of a resistor $R_{90}$ and a pi filter comprising $C_{90}$, $R_{91}$ and $C_{91}$. Connected across the output of the pi filter is a divider $R_{92}$ and $R_{93}$. The latter is adjustable and has the potential developed at its arm coupled to terminal 203 via resistor $R_{94}$. The negative side of the reference supply is connected to terminal 205. The voltages appearing at terminals 203 and 205 comprise substantially constant D.C. potentials which are regulated and stabilized by a circuit connected across the divider $R_{92}$, $R_{93}$. This circuit includes a transistor $Q_{90}$ interconnected with another transistor $Q_{91}$.

One branch of the regulating circuit comprises a series combination of resistor $R_{95}$, the emitter-collector of $Q_{90}$, and a zener diode $D_{93}$. A second branch comprises resistor $R_{97}$, the collector-emitter of $Q_{91}$ and a resistor $R_{96}$. The base of $Q_{90}$ is connected to the junction of $R_{97}$ and the collector of $Q_{91}$. The base of $Q_{91}$ is connected to the junction of the collector of $Q_{90}$ and the zener diode $D_{93}$. The foregoing arrangement serves to provide a stabilized potential across resistor $R_{93}$ and hence yields stabilized potentials at the terminals 203 and 204. Thus it may be seen that the potential across $D_{93}$ tends to be constant whereby the collector current of $Q_{91}$ tends also to be constant. The stages $Q_{90}$ and $Q_{91}$ interact to produce a constant current through the zener diode $D_{93}$ to stabilize the aforementioned reference potentials.

The input section of the sensing circuit includes $R_{100}$ connected across input terminals 201 and 202. In serial relationship across $R_{100}$ is the series combination of resistor $R_{101}$ and parallel, oppositely-polarized diodes $D_{102}$ and $D_{103}$. Connected in shunt with the diodes is a capacitor $C_{100}$. This input circuit is designed as a noise filter and to prevent damage to the sensing circuit through malfunctions or errors associated with the input circuit. Thus the diodes $D_{102}$ and $D_{103}$ prevent the development of excessive base-emitter potential in the sensing circuit.

From the input section, the sensed signal is coupled to the base of input stage $Q_{100}$ and to the intermediate point of a divider $R_{102}$ and $R_{103}$ via a coaxial line $M_{100}$. The sensing circuit including the divider is connected across the source comprising secondary winding $SW_{100}$ and diodes $D_{100}$ and $D_{101}$ in full wave configuration. This source produces a pulsating potential which is applied to terminals $E_{100}$ and $E_{101}$ of the sensing circuit. As noted hereinafter this potential provides the intermittently-activated regeneration described generally hereinbefore and in greater detail hereinafter.

The collector of $Q_{100}$ is connected to $E_{100}$ via $R_{104}$ while its emitter is connected to $E_{101}$ via $R_{105}$. A divider is provided from the collector to $E_{101}$ and comprises the serial combination $R_{106}$, $R_{107}$ (adjustable) and $R_{108}$. The arm of $R_{107}$ which is set for balancing purposes is connected to the base of the second stage, $Q_{101}$. This base is also returned to the input connection at divider $R_{102}$ and $R_{103}$ by way of the parallel combination $R_{109}$ and $C_{101}$. The latter is designed to decouple transients from the regenerative circuit. The emitter of $Q_{101}$ is connected to the emitter of $Q_{100}$ while its collector is connected to $E_{100}$ via $R_{110}$.

The employment of divider $R_{102}$ and $R_{103}$ provides the feature whereby one side of the input circuit is connected in effect to the center or zero potential point of the supply $E_{100}$–$E_{101}$. This has the beneficial effect of eliminating the effects of asymmetry, line voltage fluctuation and related conditions.

The circuit thus far described exhibits an intermittent regenerative characteristic at which times high sensitivity prevails. The source of this regeneration lies in the coupling circuits between $Q_{100}$ and $Q_{101}$ which together form a regenerative loop. One of these couplings involves the connection of the collector of $Q_{100}$ to the base of $Q_{101}$ via the divider which includes $R_{106}$, $R_{107}$ and $R_{108}$. The common emitter connections to $R_{105}$ provides the other coupling. When the potential $E_{100}$–$E_{101}$ is low, the circuit is in a low gain state nothwithstanding its regenerative characteristic; there is therefore negligible response to the signal applied at terminals 201 and 202. When the voltage $E_{100}$ rises however, the circuit is transformed to its high gain regenerative and sensitive state. During this interval the input signal is sensed and produces a related output at the collector of $Q_{101}$.

The stages $Q_{102}$ and $Q_{103}$ are driven by the collector output of stage $Q_{101}$. The function of these latter two stages is to provide power amplification which thereby enables sensing stages $Q_{100}$ and $Q_{101}$ to operate at a relatively low and constant power level. This arrangement mitigates to a great extent the temperature compensation problems arising from self-heating.

The base of $Q_{102}$ is connected directly to the collector of $Q_{101}$. The emitter of $Q_{102}$ is connected to $E_{100}$ via $R_{111}$. The collector of $Q_{102}$ connects to $E_{101}$ via the series combination $R_{112}$ and $R_{113}$. The junction of these two is connected to the base of $Q_{103}$.

The emitter of output stage $Q_{103}$ is returned to $E_{101}$ via $R_{115}$. The collector is connected to $E_{100}$ via the output relay $K_{100}$.

The circuit connection which includes $R_{114}$ introduces a regenerative characteristic in the power amplifying stages $Q_{102}$, $Q_{103}$ to enhance their net gain.

In the illustrated sensitive relay application and with the input connections as shown, resistor $R_{93}$ is set to provide a voltage of desired value, say, 0.9 volt at terminal 203. A fraction of this reference voltage, determined by the values of divider resistor $R_{302}$ and $R_{300}$, is applied at input terminal 202. Illustratively, this adjusted reference voltage may be of the value 9 millivolts (positive to ground).

It will be assumed initially that the input at terminal 201 is less than 9 millivolts. Under these conditions a negative signal voltage is applied to the base of $Q_{100}$. During the highly regenerative periods, this voltage is sensed and tends to reduce conduction of $Q_{100}$. The collector voltage thus rises and the potential across $R_{105}$ due to $Q_{100}$ falls, tending thereby to increase conduction of $Q_{101}$. The regenerative characteristic accentuates this response and $Q_{101}$ is driven to saturation.

Under these conditions, the relatively large potential across $R_{110}$ provides large forward drive to $Q_{102}$ whereby conduction of the latter increases. The resultant increased potential across $R_{113}$ serves to increase forward drive to $Q_{103}$ and this latter is driven very rapidly to saturation whereby $K_{100}$ is energized. This action which is virtually instantaneous, is abetted by the regeneration effect of $R_{114}$.

All of the foregoing occur in rapid fashion during the sensing interval when the potential $E_{100}$–$E_{101}$ has increased beyond the threshold value. The action is cyclically repeated so long as the input at terminal 201 remains less than 9 millivolts. Diode $D_{104}$ across $K_{100}$ keeps the latter energized nothwithstanding the repetitive action, until the input signal changes to a value effective to cause switching.

If the input should change to a value greater than 9 millivolts during the next regeneration period $Q_{100}$ is turned full on and $Q_{101}$ is full off. Thus stages $Q_{102}$ and $Q_{103}$ are cut off and relay $K_{100}$ de-energized. The normally-open contacts close to complete any desired output circuit such as the energizing circuit of a control device or indicator. The normally-closed contacts are opened and may perform related tasks such as disabling, transfer and other functions. This switching is effected with a very small change in input, say from 9 millivolts to 10 millivolts. Using a convenient commercial relay, e.g., an Elgin Advance type MV20–120D–31, load currents of 2 amperes per contact set are switched in response to this small input signal. In example, power gains of the order of $10^{13}$ are readily obtained. So sensitive is the circuit that care must be exercised in contending with noise and other spurious conditions.

In order to mitigate this problem in applications where the full response characteristic is not required, there is provided in the illustrated amplifier means for limiting circuit sensitivity during certain intervals and under certain conditions. As embodied these means take the form of a feedback T network interconnecting the base of $Q_{101}$ and the collector of $Q_{102}$ and shown in bold outline. Thus, the series branch of the T comprises $R_{120}$ conected to the base of $Q_{101}$ and $R_{121}$ connected to the collector of $Q_{102}$. The shunt element comprises capacitance $C_{120}$ connected to source point $E_{101}$.

The function of the sensitivity control means is to impart a memory function to the overall circuit. A type of limited hysteresis results; the control means store a voltage on $C_{120}$ related to the previous signal input which effected an output response (switching of $K_{100}$). This voltage is in aiding relationship with succeeding signal inputs of the same relative polarity and tends to remain as a charge on $C_{120}$ for a period equal to at least several sensing cycles. This charge on $C_{120}$ is attenuated by the divider comprising $R_{120}$ and $R_{109}$ and, thus reduced, is applied to the base of $Q_{101}$ in aiding relationship to successive signals of the same general amplitude condition. Noise and other spurious inputs so far as they tend to switch the circuit out of its last state, are thus opposed. On the other hand, a sustained and definite change in the signal to be sensed overcomes this offsetting effect and provides a new response.

With the foregoing arrangement, effective and controllable limitations on the sensitivity of the overall circuit are provided during certain conditions and intervals thereby limiting the effects of noise and other spurious actions without substantially impairing basic circuit response.

The amplitude of the feedback supplied to the base of $Q_{101}$ may be varied by changing the resistance of $R_{120}$. A higher resistance of $R_{120}$ reduces the amplitude of the feedback, and conversely a lower resistance of $R_{120}$ increases the feedback amplitude.

An input signal changing its polarity must achieve a sufficient level at the base of $Q_{101}$ to override the latching feedback amplitude at that point before the combined effective potential there follows the polarity of the changed input. Thus, the regenerative amplifier will continue to switch into a certain state, although the input signal has changed polarity, until the level of the changed polarity signal equals and cancels the stored feedback amplitude, thus causing an effective null input condition. It is to be understood that such a null exists for each of the two possible switched states of the regenerative amplifier, defining between them the range of input signals insufficient to switch the regenerative amplifier into its opposite state.

Outside the nulls, the polarity of the input signal predominates over the feedback level and determines the state of amplifier switching.

A very small feedback signal, corresponding to a high resistance of $R_{120}$, results in a very small band of insensitivity between the two nulls.

If $R_{120}$ is made to be adjustable as by a potentiometer, the band of insensitivity may be varied thereby to suit requirements of operation. Adjustment of the desensitized band may be made to compensate for varying amounts of spurious signals and noise in the input signal. By employing two paralleled feedback circuits, each such as the one shown in heavy lines in FIGURE 1 and each with an oppositely-poled diode in series for polarity discrimination, the amount of feedback may be made to differ in amplitude between each of the two switching polarities. That is, a relatively small signal may be made sufficient to switch the amplifier in one direction, while a selectively larger signal may be required to switch the amplifier back again.

Various additional applications are made possible by the feedback circuit. For example, the circuit of FIGURE 1 may be used as a signal threshold indicator. Signals of a new polarity below the threshold set by the feedback amplitude fail to switch the amplifier, while signals above this threshold operate to switch it.

A relatively short time-constant is desired for the feedback circuit when used as a sensitivity-limiting arrangement. Capacitor $C_{120}$ should be small enough in this application to delay the feedback only slightly, so as to bias the amplifier input at the required level by the time of the next succeeding regenerative cycle from the power supply.

The use of a large time constant, obtained by changing the value of $C_{120}$ to a larger capacity, results in transient regenerative amplification having altered characteristics. If the time constant is fairly long relative to the regeneration control frequency, the feedback influence is negligible for a time after an amplifier switching action. The amplifier is thus still highly sensitive and a random input signal will cause switching as if no desensitizing feedback were provided. However, upon the sustained occurrence of a signal having a particular polarity, the feedback has an opportunity to build up in amplitude. Thus, as time goes on, an increasingly stronger input signal of the opposite polarity is required to switch the amplifier. In effect, the amplifier acquires a "habit" of switching into the particular state sustained for a time by an input signal. After a sufficient time to acquire a "habit," the occurrence of a very large input signal of opposite polarity will switch the amplifier to its opposite state, but the previously acquired habit will tend to be retained. If the large amplitude of the new input decreases immediately, the amplifier will go back to switching into its prior state in accordance with the habit acquired in the feedback circuit. Thus a sustained input signal having a new polarity is required to "break" the habit.

A variation of the "habit" circuit described above is one employing a fast acting (short time constant) feedback circuit in combination with a long-time constant, slow acting, feedback circuit. In this arrangement only one large signal of new polarity is required to "break" the habit, as the fast feedback circuit output would cancel the habit retained by the long time-constant circuit. Potentiometers used in the feedback circuits could vary the habit-acquiring and habit-breaking characteristics of the circuit.

Figure 2:
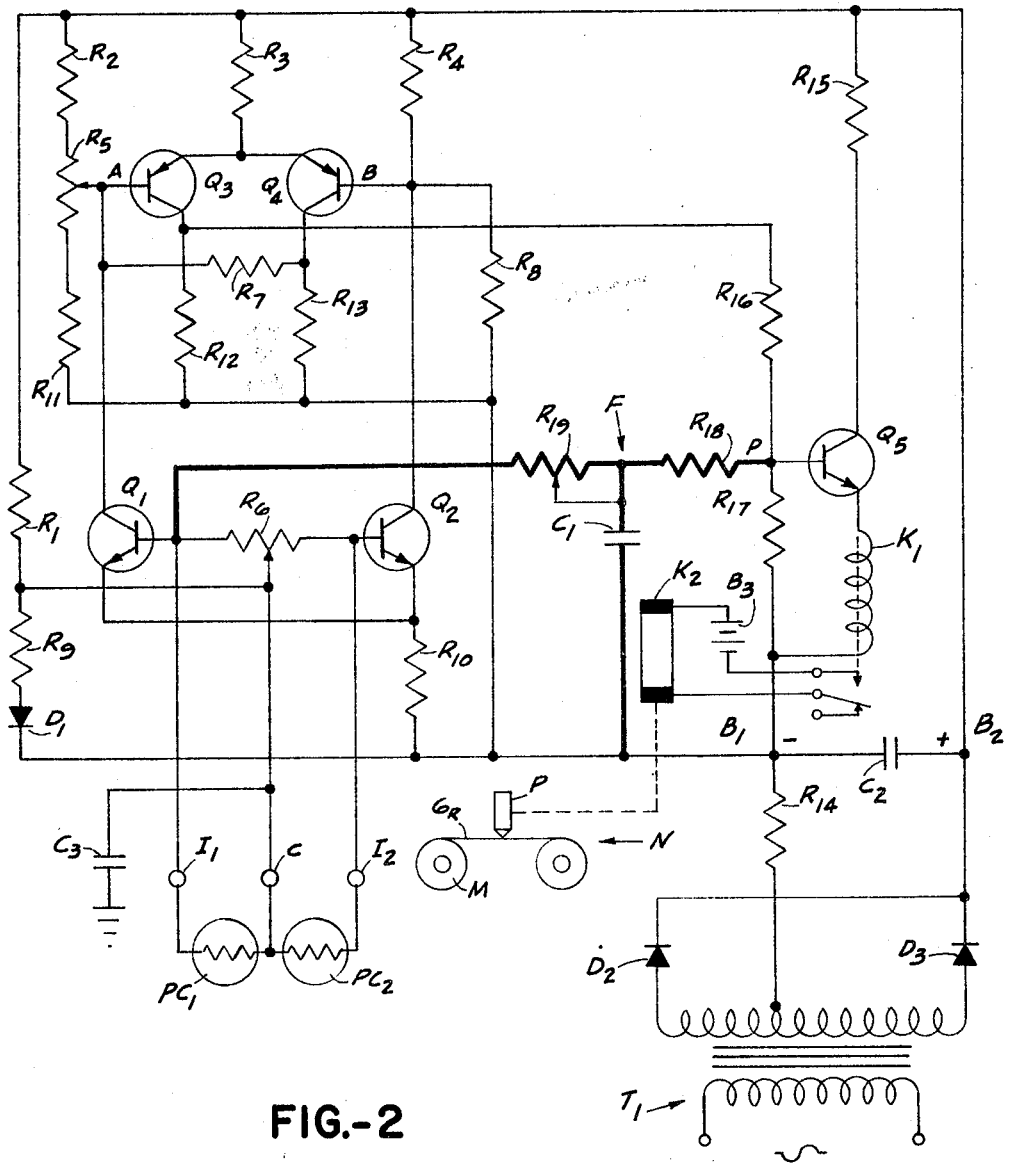
FIGURE 2 is a schematic diagram of a transiently regenerative amplifier employing in-phase stored feedback adapted for use with a differential input.

Referring to FIGURE 2, the circuit therein employs a transiently regenerative amplifier together with stored feedback means in aiding relationship with the input signal. The circuit of FIGURE 2 is thus similar in these respects to the circuit of FIGURE 1.

The circuit of FIGURE 2 is illustratively used as a sunshine-sensing device, having a dual photocell input and a recorder output. This circuit comprises a power supply; an input circuit and signal preamplifier comprising transistors $Q_1$ and $Q_2$ with associated circuitry; a transiently regenerative amplifier comprising transistors $Q_3$ and $Q_4$ with associated circuitry; a stored feedback circuit F comprising resistors $R_{18}$, $R_{19}$ and capacitor $C_1$; and an output indicating circuit including a recording device N.

Photocells $PC_1$–$PC_2$ provide a differential input to the preamplifier whose output is employed to switch the transiently regenerative amplifier according to light relations sensed by $PC_1$ and $PC_2$. The stored feedback circuit F latches the circuit in the appropriate switched state. When the regenerative amplifier output is of the state which operates relay $K_1$, the contacts of the latter actuate solenoid $K_2$ for controlling pen recorder N.

The power supply comprises full-wave rectifier transformer $T_1$, together with diodes $D_2$ and $D_3$. Rectified A.C. from the tap on $T_1$ is connected through $R_{14}$ to negative terminal $B_1$ and directly from the connected cathodes of $D_2$, $D_3$ to positive terminal $B_2$. Capacitor $C_2$ is illustratively 0.1 microfarad, a value substantially less than that required for conventional filtering; it is used to decouple high frequency disturbances including noise. Thus the power output at $B_1$–$B_2$ is a pulsating D.C., returning to substantially zero potential every half-cycle.

The input to the preamplifier is illustratively from photoelectric cells $PC_1$ and $PC_2$. Photocell $PC_1$ is conveniently located in a shaded outside area so as to continually register the light intensity of shade. Photocell $PC_2$ is conveniently disposed to receive sunlight or a derivative thereof so as to register the light intensity therefrom. Photocells $PC_1$ and $PC_2$ may be conveniently arranged in a weather-protected device, $PC_1$ being shaded by a ring suitably disposet to the sun's ecliptic. In the absence of sunlight, both photoelectric cells register relatively similar light intensities. When the sun appears, $PC_2$ indicates the sunlight intensity, registering a greater output than $PC_1$ which indicates the shadow intensity level at that time.

The two photocells are connected differentially to the preamplifier comprising stages $Q_1$ and $Q_2$. The photocell common connections are connected via input terminal C to the arm of balance potentiometer $R_6$. The $PC_1$ signal lead is connected via terminal $I_1$ to the base of transistor $Q_1$; the $PC_2$ signal lead is connected via $I_2$ to the base of transistor $Q_2$.

Potentiometer $R_6$ is connected between the bases of $Q_1$ and $Q_2$; its arm, besides connection to the photocell common connections noted above, is returned to the junction of serial resistances $R_1$ and $R_9$ in a divider across $B_1$, $B_2$ which comprises serial elements $R_1$, $R_9$ and diode $D_1$. Potentiometer $R_6$ is adjusted to balance the photocell outputs so that a condition of relatively similar light intensity at the cells results in relatively equal signals at the bases of $Q_1$ and $Q_2$.

The emitters of $Q_1$ and $Q_2$ are tied together and connected through $R_{10}$ to power terminal $B_1$. The collectors of $Q_1$ and $Q_2$ are connected to the bases of $Q_3$ and $Q_4$ respectively and thence via circuits in the regenerative amplifier as described more fully hereinafter to power terminal $B_2$.

The transiently regenerative amplifier comprising $Q_3$ and $Q_4$ employs conveniently the means of a varying power source for instituting and ending regeneration at desired times. In this case, the full-wave rectified A.C. at terminals $B_1$–$B_2$ is applied without substantial filtering across the transiently regenerative amplifier and the preamplifier.

The emitters of $Q_3$ and $Q_4$ are connected together and returned through resistor $R_3$ to $B_2$. The bases of $Q_3$ and $Q_4$ are connected to appropriate points A and B on respective serial potential dividers $R_2$, $R_5$, $R_{11}$ and $R_4$, $R_8$, connected across the pulsating supply. The potential at the base of $Q_3$ is adjustable by means of potentiometer $R_5$ to obtain the balance between transistors $Q_3$ and $Q_4$ required for proper initiation of regeneration.

The collectors of $Q_3$ and $Q_4$ are each returned through a respective resistance $R_{12}$ and $R_{13}$ to negative supply terminal $B_1$. Resistor $R_7$ completes the regenerative loop from the collector of $Q_4$ to the base of $Q_3$.

The differential input signal from the photocells varies the collector currents through transistors $Q_1$ and $Q_2$. A part of the collector current of transistor $Q_1$ flows through the base-emitter circuit of transistor $Q_3$; similarly, part of the collector current of transistor $Q_2$ flows through the base-emitter circuit of $Q_4$.

As the pulsating supply brings the circuit components to conditions of operability, the collector current of transistors $Q_3$ and $Q_4$ increase. Depending on the polarity of the photocell input signal, the current through one of the regenerative amplifier stages will be greater than the other. Assuming the signal at the base of $Q_1$ to be more positive than that at the base of $Q_2$, a greater current will flow through the collector of $Q_1$, and through the base-emitter circuit of $Q_3$; as a consequence greater collector current will flow through transistor $Q_3$. The collector currents through $Q_2$ and through $Q_4$ will be of correspondingly lesser value.

The increase in collector current through transistor $Q_3$, flowing through resistor $R_3$ to the momentarily positive supply, causes an increased potential drop across $R_3$. Accordingly, the $Q_3$–$Q_4$ emitters become more negative and the emitter of $Q_4$ is thus made more negative with respect to its base potential. As a consequence, base-emitter current through transistor $Q_4$ decreases, and the $Q_4$ collector current flowing through $R_{13}$ decreases. As a result, the potential drop across $R_{13}$ decreases, and the negative-going potential at the collector of $Q_4$ is transferred through resistor $R_7$ back to the base of transistor $Q_3$. This signal, transferred through resistor $R_7$, aids the initial increase in base-emitter current through $Q_3$. Transistor $Q_3$ therefore increases further in collector current conduction, in turn causing the collector current through transistor $Q_4$ to decrease further. The signal thus regenerates continuously until transistor $Q_3$ saturates and transistor $Q_4$ is cut off. At this time the output of the transiently regenerative amplifier, taken from the collector of transistor $Q_3$, is at a maximum positive value owing to the saturating collector current of $Q_3$ flowing through resistor $R_{12}$.

The maximum positive output of the regenerative amplifier is coupled through resistor $R_{16}$ to the base of relay transistor $Q_5$. It may be seen that the drop across the $Q_3$ collector resistor $R_{12}$ is in parallel with the divider $R_{16}$–$R_{17}$, the potential across $R_{17}$ being applied to the base-emitter circuit of $Q_5$.

An increase in $Q_5$ base-emitter current, resulting from the positive output of $Q_3$, causes in turn an increased collector-emitter current through $Q_5$. This current flows through the field of relay $K_1$, energizing it, and causing, in the illustrated case, the contacts thereof to close. These contacts actuate an output device, such as a solenoid $K_2$ which is energized from a source $B_3$. The solenoid $K_2$ illustratively operates a pen P on a graph GR, having a continuously moving recording medium driven by motor M. Thus, with motor M continuously driving the record GR, the pen P will produce a mark on GR of a length related to the period of time in which the amplifier is in the ON state. This may conveniently correspond with periods of sunshine so that the occurrence and length of same are indicated.

The signal at the base of transistor $Q_5$ also provides a source of feedback to be supplied to the base of preamplifier transistor $Q_1$ in an aiding relationship with the input signal from the photocells. This in-phase feedback is coupled through network F comprising $R_{18}$, $R_{19}$, and $C_1$, to the base of $Q_1$, capacitor $C_1$ affording a short time-delay. The function of the components of the feedback network is to delay the feedback slightly and also to attenuate it to a level suitable for employment with the inputs from the photocells. Capacitor $C_1$ charges over a relatively short time interval toward the potential at the base of $Q_5$, and the feedback thereupon appears at the base of $Q_1$ accordingly, very shortly after switching of transistors $Q_3$ and $Q_4$. The feedback remains at the base of transistor $Q_1$ over several cycles of operation, aiding the potential of the photocell signal which originated the regeneration causing the relay output. So long as this feedback remains, small signals, noise, or interference which would otherwise tend to switch the regenerative amplifier into the opposite state will have no effect. In effect, the stored and delayed feedback described herein desensitizes the preamplifier input and influences the circuit to retain the regenerative switching condition of the signal which initiated the feedback. This effect is similar to that of FIGURE 1 and may be termed "latching" in view of the tendency of the in-phase feedback as described to maintain the same switching condition originated by a particular differential input signal until that input signal changes polarity and has, in addition, sufficient amplitude to overcome the bias supplied by the feedback network to the input circuit. When the latter occurs, the regenerative amplifier switches into the alternate state, and the in-phase feedback consequent therefrom tends to maintain the said alternate state. Thus latching occurs in both switched states.

In the illustrated case, the effect of the alternate switched state to the one first described is to maintain deenergization of relay $K_1$, thus maintaining deactivation of the pen solenoid $K_2$. When $Q_3$ is cut off and $Q_4$ saturated, the $Q_3$ collector output to the base of $Q_5$ is negative, preventing the flow of emitter current through $Q_5$ and the relay armature of $K_1$.

The divider which is connected between $B_1$ and $B_2$ and which comprises $R_1$, $R_9$ and diode $D_1$ serves several functions. The preamplifier is biased therefrom by a connection of the arm of potentiometer $R_6$ to the junction of $R_1$ and $R_9$. Diode $D_1$ serves to compensate for temperature variations, varying the bias on the preamplifier according to the ambient temperature. Diode $D_1$ also serves a biasing function in the early part of the regenerative cycle, owing to its non-linear characteristic at the lower portion of its conduction curve. As the A.C. cycle commences, power is applied sinusoidally and operating potentials are applied across the transiently regenerative amplifier and the preamplifier. The bias potential applied at the arm of potentiometer $R_6$ is at first a relatively large proportion of the divider voltage owing to the initial high impedance of $D_1$ at that early part of the A.C. cycle. Thus the base potentials of $Q_1$ and $Q_2$ rise quickly. Subsequently, at a certain point in the A.C. cycle the impedance of diode $D_1$ decreases, tending to thereafter maintain the preamplifier bias at a suitable level determined by the drop across $R_9$ and $D_1$ in series.

Figure 3A:
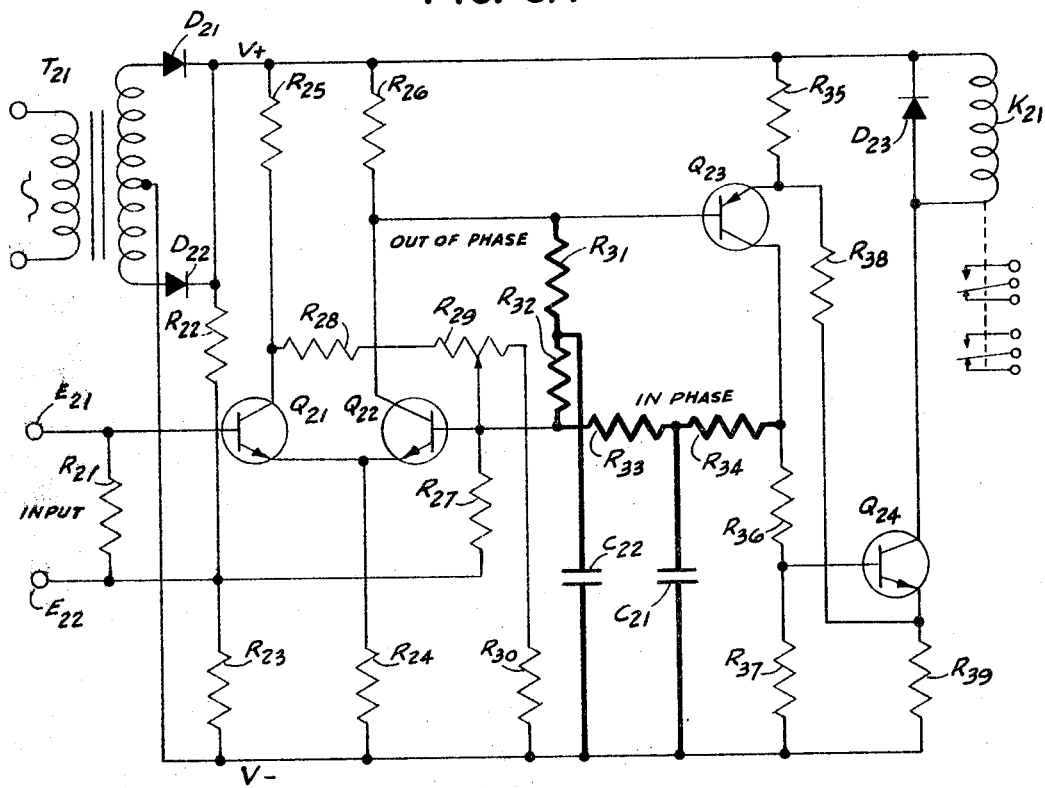
FIGURE 3 is a schematic diagram of a transiently regenerative amplifier and diagrammatic responses thereof, employing both in-phase stored feedback and out-of-phase stored feedback.

FIGURE 3A illustrates a transiently regenerative amplifier employing stored feedback in-phase with the input signal. This in-phase feedback circuit is similar in operation to the feedback circuit of FIGURES 1 and 2. In addition, a stored out-of-phase feedback circuit is employed.

The circuit of FIGURE 3A comprises a power supply, a transiently regenerative amplifier comprising $Q_{21}$ and $Q_{22}$ with associated circuitry, and output switching circuit comprising $Q_{23}$ and $Q_{24}$ with associated circuitry, an in-phase feedback network $R_{33}$, $R_{34}$, and $C_{21}$, and an out-of-phase feedback network $R_{31}$, $R_{32}$ and $C_{22}$.

The input signal at terminals $E_{21}$–$E_{22}$ is supplied directly to the $Q_{21}$–$Q_{22}$ regenerative amplifier. Transient activation and disabling of $Q_{21}$–$Q_{22}$ is furnished by the power supply. The output of $Q_{22}$ is inverted by $Q_{23}$ and supplied to relay-actuating transistor $Q_{24}$, which controls output relay $K_{21}$. The in-phase stored feedback circuit provides latching in a manner similar to that described in connection with the circuits of FIGURES 1 and 2. The out-of-phase stored feedback circuit provides latching cancellation, and, for applications in which the out-of-phase feedback amplitude is designed to exceed the in-phase feedback level, a duty cycling function is obtained in a manner to be described hereinafter.

The periodic disabling and actuation of $Q_{21}$–$Q_{22}$ is controlled by the pulsating D.C. voltage at terminals V+, V– of unfiltered full-wave power supply $T_{21}$, $D_{21}$ and $D_{22}$. The cathodes of $D_{21}$ and $D_{22}$ are tied together and provide the pulsating positive voltage at V+. The center tap of the $T_{21}$ secondary is the negative, or common return, at V–.

An input signal, illustratively in the low millivolt range, is impressed at terminals $E_{21}$–$E_{22}$ across input transistor $R_{21}$. Input terminal $E_{21}$ is connected directly to the base of $Q_{21}$, and input terminal $E_{22}$ is connected to the junction of a power supply voltage divider $R_{22}$, $R_{23}$ and therefrom through $R_{27}$ to the base of transistor $Q_{22}$. In effect, this arrangement provides a differential conection of the input signal to $Q_{21}$–$Q_{22}$ and any unbalance therein will act to switch the amplifier into the appropriate regenerative state.

The amplifier circuit includes common emitter resistance $R_{24}$ which is returned to power terminal V–, and respective collector resistances $R_{25}$, $R_{26}$ which are connected to V+. The collector of $Q_{21}$ also connects to a series branch comprising $R_{28}$, potentiometer $R_{29}$ and $R_{30}$, the latter connects to V–. The arm of potentiometer $R_{29}$ is connected to the base of $O_{22}$, being adjusted for amplifier balance so that equal currents flow in each circuit; this insures that equal and opposite minimal detectable input sigals will regenerate $Q_{21}$ and $Q_{22}$ in the appropriate direction during the periodic application of the power supply potential at V+, V–.

Assuming a more negative input at $E_{21}$, at the application of power at V+, V– less base-emitter current flows through $Q_{21}$ than through $Q_{22}$. As a result, collector current through $Q_{21}$ is lower and the potential at the collector thereof is higher. This increased potential is copuled through resistor $R_{28}$ and through part of potentiometer $R_{29}$ to the base of transistor $Q_{22}$. As a result of the increased potential at the base of transistor $Q_{22}$, increased collector current flows therein. The increased collector current through $Q_{22}$ is the result of the input signal being amplified by both $Q_{21}$ and $Q_{22}$; therefore, the increase in $Q_{22}$ collector current is greater than the decrease in $Q_{21}$ collector current caused by the negative input signal at $E_{21}$. The net current flow through common emitter resistor $R_{24}$ is therefore increased, and the result is a more positive potential at the emitters of $Q_{21}$ and $Q_{22}$. This positive potential reduces further the base-emitter current through $Q_{21}$, causing the $Q_{21}$ collector current to further decrease. This action continues regeneratively until $Q_{22}$ is saturated in the fully-on conductive state, and $Q_{21}$ is cut off.

The output of the transiently regenerative amplifier is conveniently taken from the collector of $Q_{22}$ and supplied to the base of transistor $Q_{23}$. Under the assumed input condition (base of $Q_{21}$ relatively negative), transistor $Q_{22}$ is full on, its collector is more negative as is the base of $Q_{23}$; increased $Q_{23}$ base-emitter current thus flows. Consequently increased collector current flows in $Q_{23}$ and through $R_{36}$ and $R_{37}$ in the collector return. The resulting potential at the junction of $R_{36}$ and $R_{37}$, which is connected to the base of $Q_{24}$, increases. This results in increased base-emitter current through relay transistor $Q_{24}$, causing the $Q_{24}$ collector current to increase. As the increased collector current flows through the relay $K_{21}$, it is energized, closing the normally-open contacts; this action constitutes the output switching which is seen to be consequent upon a negative-going input at $E_{21}$. If $E_{21}$ were positive, $Q_{22}$ is cut off by regeneration and the relay $K_{21}$ is de-energized.

The increased collector-emitter current of $Q_{24}$ flowing through $R_{39}$ causes a more positive potential to appear across $R_{39}$; this potential is coupled through $R_{38}$ back to the emitter of $Q_{23}$ reinforcing the increased collector current therethrough. This positive feedback function serves to insure a corresponding positive relay actuation.

The in-phase stored feedback network $R_{34}$, $R_{33}$ and $C_{21}$ in T configuration functions as follows. For the assumed input condition, the positive-going potential at the collector of transistor $Q_{23}$ is coupled through feedback resistor $R_{34}$, delayed slightly and stored by the relatively small capacity of storage capacitor $C_{21}$. The voltage on $C_{21}$ is coupled through the relatively high resistance of $R_{33}$ back to the base of transistor $Q_{22}$. The positive-going direction of this feedback is in-phase with the input signal at $E_{21}$–$E_{22}$ which illustratively caused the base of transistor $Q_{22}$ to originally become more positive during the transient regeneration which followed circuit activation by the rising power supply voltage. Inasmuch as the feedback is delayed slightly, it has no effect upon the initial regenerative action which produces the feedback.

The in-phase delayed feedback as stored by capacitor $C_{21}$, lasts over at least one cycle of power supply pulsation. Thus, the in-phase feedback provides a latching effect, i.e., a tendency for the transiently regenerative amplifier to unbalance into the original switched state whenever the power supply permits regeneration. An input signal of changed polarity and of sufficient amplitude to cancel this latching tendency is required before switching to the alternate state will occur.

This latching tendency operates in conjunction with an opposing and ultimately dominating tendency furnished by the out-of-phase feedback network $R_{31}$, $R_{32}$, and $C_{22}$. The out-of-phase feedback is taken from the collector of $Q_{22}$, which is more negative under the assumed input condition at $E_{21}$–$E_{22}$. This more negative potential is coupled through feedback resistor $R_{31}$, delayed appreciably by the relatively large capacity of storage capacitor $C_{22}$, and further coupled by feedback resistor $R_{32}$ back to the base of transistor $Q_{22}$. The values of the components of the feedback circuits are for this application selected to produce a greater delay in the out-of-phase feedback than in the in-phase feedback. In addition, the values may be also selected to yield an out-of-phase peak feedback level exceeding the peak level of the in-phase feedback for obtaining the oscillatory duty cycle action described below.

The in-phase stored feedback is quickly impressed upon the transiently regenerative amplifier at the base of $Q_{22}$, acting to latch the regenerative amplifier, and in effect decreasing the sensitivity of the amplifier so that only a new input exceeding the in-phase feedback level can accomplish amplifier switching. The in-phase feedback is quickly established at a level which illustratively lasts over a number of regeneration cycles. Then, several power cycles later, the out-of-phase delayed feedback begins to exert an appreciable effect, gradually rising in potential and thus increasingly opposing the in-phase feedback.

The out-of-phase feedback continues to increase, completely cancelling out the effective latching derived from the in-phase feedback, and producing a resultant preponderance of out-of-phase feedback at the base of transistor $Q_{22}$. Should this occur with a relatively small signal input, the amplifier will regenerate during the next enabling cycle in a direction opposite its prior state. If a larger input signal exists, the out-of-phase feedback has to cancel out the combination of input level and positive feedback signal before switching into the alternate state will occur. The greater the input signal, the longer it takes for the delayed out-of-phase feedback to achieve the necessary cancellation level. Hence, it can be seen that the period during which the output switching is in the direction dictated by the input signal, i.e., is repetitively switching into the "preferred" state, is related to the amplitude of the input signal.

Once the negative feedback signal becomes dominant over the positive feedback and the assumed input at $E_{21}$, transistor $Q_{21}$ is switched full on and transistor $Q_{22}$ is cut off. The output of the transiently regenerative amplifier is then most positive, cutting off transistor $Q_{23}$ and thus cuting off relay transistor $Q_{24}$. In this state of the regenerative amplifier, relay $K_1$ is not energized.

The reversal in output switching causes a coresponding polarity reversal in the in-phase stored feedback whereby the latter is now additive with the long time constant negative feedback and in opposition to the assumed input. A succession of output pulses in the non-preferred direction thus occurs. However, the negative feedback now gradually reverses polarity until the condition is reached where the assumed input signal again predominates. It can be seen that this will occur more or less rapidly in dependence on the amplitude of the input signal. When the transition occurs, the input signal switches the regenerative amplifier back to its original "preferred" state where $K_1$ is energized.

The cycling of the regenerative amplifier continues in this manner unless affected by changes in the input signal. A sufficiently strong input signal can override the effect of both stored feedbacks and maintain the amplifier switching in the preferred state. This is particularly advantageous in control applications where a large input signal reflects a system need for full control action.

Figure 3B:
Figure 3C:
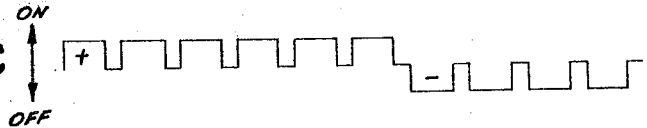
Figure 3D:
Figure 3E:
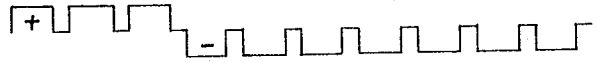
Figure 3F:

Lesser input signals affect the periods of time between the amplifier's preferred periods and opposite periods. Thus, the periods of a train of relay actuation pulses (e.g. "+" pulses, FIGS. 3B–3E) and a train of relay deactivation pulses ("−" pulses, FIGS. 3C–3F) vary inversely to one another and are each affected by the magnitude and direction of the input signal. Hence, the total effective time that output relay $K_{21}$ is energized can be made to vary from all the time (FIG. 3B) to no time (FIG. 3F), the transition betwen these extremes being smooth and continual and the proportion of "off" time to "on" time being responsive to slight changes in the input signal level. Thus FIGS. 3C, 3D and 3E represent the response to three input conditions comprising a negative input at $E_{21}$ (FIG. 3C), no input (FIG. 3D) and a positive input (FIG. 3E). Note that with no signal input at $E_{21}$, the amplifier is in balanced oscillation, and equal periods of time are spent in either state producing equal periods of relay actuation and deactivation.

Resistor $R_{38}$ is provided to insure relay actuation only during those times when $Q_{22}$ is saturated, but not at times of amplifier balance or at times $Q_{21}$ is saturated. Whenever current levels determined by the intermediate potentials of amplifier balance occur, resistor $R_{38}$ operates to regenerate the output circuit into a de-energized state.

Diode $D_{23}$ by-passes the induction pulse produced by the relay $K_{21}$, preventing this pulse from affecting the circuit.

An alternate application of the circuit of FIGURE 3 may be obtained by varying the stored feedback characteristics. In the proportioned control just described, the maximum negative feedback exceeded maximum positive feedback. If, however, the components of the stored feedback circuits are changed to make the peak amplitudes of the out-of-phase feedback slightly less or equal to the peak amplitude of in-phase feedback, as by increasing the value of $R_{32}$ appropriately, a different mode of operation is obtained, wherein the amplifier periodically has increased sensitivity over the circuits of FIGURES 1 and 2 owing to cancellation of the latching feedback.

Assuming the stored feedbacks are equal, and that the relative time delays remain the same as described above in connection with the circuit shown in FIGURE 3, in-phase feedback is applied immediately after a regeneration switching of the amplifier. As above, the presence of in-phase feedback at the base of transistor $Q_{22}$ effectively desensitizes the input and latches the amplifier in the switched state. Again, as above, at the moment of latching and for some time thereafter, a new signal at the input of the amplifier of an new polarity must overcome the latching potential of the in-phase feedback before the amplifier can be switched.

The out-of-phase feedback is delay longer than the in-phase feedback, and builds up over many power supply cycles. As the out-of-phase feedback builds up, it increasingly opposes and cancels the effect of the in-phase feedback at the base of transistor $Q_{22}$. As the out-of-phase feedback level approaches that of the in-phase feedback level, the latching effect is cancelled out. Eventually, the effective latching becomes so small as to be negligible, and the amplifier is then in a state of maximum sensitivity ready to regenerate according to the polarity of an input signal upon the next application of power supply potential.

It should be noted that in order to obtain the latching cancellation and periodic maximum gain just described, it is necessary that the stored out-of-phase feedback not exceed the level of the in-phase feedback at any time. If the out-of-phase feedback did exceed the in-phase feedback, the circuit would oscillate in a manner similar to that above described in connection with proportioned control.

To facilitate the obtaining of a characteristic of periodic maximum gain with the circuit of FIGURE 3, $R_{32}$ may be made adjustable. In the alternative, a mixing circuit may be employed in conjunction with the in-phase and out-of-phase stored feedback circuits to vary the ratio of their outputs over a region near unity ratio. The optimum gain condition is achieved when adjustment is made for unity ratio of feedback signals at their maximum amplitude. With this adjustment, the out-of-phase feedback eventually reaches a level cancelling out the latching effect of the in-phase feedback. At this time the input behaves as if no feedback of any kind existed, and the maximum high gain of the transiently regenerative amplifier is obtained. Precise adjustment is required for maximum gain, as the circuit would cycle were the out-of-phase feedback excessive, and insensitivity would remain to the extent the in-phase feedback were predominant.

Still further response variations may be achieved by varying not only the relative levels, but the effective time constants of the feedback circuits as well.

It should be noted that the addition of voltage limiting means such as zener diodes at suitable points in the feedback circuit, e.g., across the storage capacitors, will eliminate the timing uncertainty normally inherent in an RC circuit.

Where the in-phase and out-of-phase networks provide long time constant and short time constant characteristics respectively, system response will depend on signal amplitude and on the direction of change of input signal magnitude.

Considering as a first condition, an input signal which is less than the relatively fast acting negative feedback, then each time the input causes switching to the preferred state, there is a following cycle in which the negative feedback predominates and causes switching to the opposite state. This oscillatory mode during signal null conditions is not influenced by the slow acting positive feedback voltage because the oscillation causes this voltage to average to zero and at most vary at low amplitude around its reference value. The oscillatory mode will persist so long as the input signal level remains below the effective negative feedback level. Hence for null signals, the oscillatory band is equal in magnitude to twice the effective level of negative feedback.

In a second condition where the applied signal exceeds the negative feedback level, the latter can not interfere with the usual switching to the preferred state. Moreover, the preferred switching is gradually reinforced with a latching tendency supplied by the slowly increasing positive feedback. Hence, once outside the null zone, for a few cycles the zone in effect appears to diminish. It will decrease to an extent dependent upon the ratio of the positive and negative feedback levels. If they are equal, the null zone appears to have vanished so far as transient short time departures of the signal are concerned. Thus a noise spike which transiently reduces the net input close to zero will not initiate the oscillatory mode because there is still an excess of combined signal and positive feedback which exceeds negative feedback. To return to the oscillatory mode, a change in input signal is necessary of a nature to overcome the stored positive feedback. In the illustrated case with the positive and negative levels equal, the signal must equal or cross zero. When this occurs oscillation commences. Hence the described arrangement is effective as a null detector, or, particularly where the positive feedback level exceeds the degenerative level, as a zero crossing indicator. By adjusting the ratio of positive and negative feedback, an oscillatory condition can be made to signify the reaching of a desired monitored or reference level.

In more general terms the response characteristic has the frequently desired virtue of a well defined, adjustable and stable null zone for signals within the null zone and a stable, latched characteristic outside the null zone.

It is thus seen that varying the relative levels of the stored feedback imparts different modes of operation to the transiently regenerative amplifier such as latching, cancellation or proportional control. Similarly, varying the delays of the stored feedback signals alters characteristics of operation such as the period of cycling or desensitized time. These may be calculated or determined for any given set of delays.

The circuit of FIGURE 4 shows a transiently regenerative amplifier having a temperature sensing input and employing both in-phase and out-of-phase stored feedback. In this respect, the circuit is most similar to the circuit of FIGURE 3. The circuit of FIGURE 4 is illustratively employed for controlling temperature by means of its switched output, which proportions the two output states according to the sensing of temperature deviation at its input.

The circuit of FIGURE 4 includes a power supply having several D.C. outputs, a temperature-sensitive bridge input circuit with a preamplifier, a transiently regenerative amplifier employing a gain chopping circuit to achieve periodic regeneration, an output switch amplifier, and in-phase and out-of-phase feedback networks. The out-of-phase feedback network is illustratively designed to provide the greater effect whereby duty cycling or proportional control is provided such as described hereinbefore and illustrated in FIGS. 3B–3F.

The positive potential for the line E+ is provided by diodes $D_{45}$, $D_{46}$ and $D_{47}$ connected to the secondary winding of transformer $T_{11}$ in combination with a filter network including $R_{41}$, $R_{42}$, $C_{43}$ and $C_{44}$. The negative potential for the line designated E— is similarly supplied via diodes $D_{43}$, $D_{44}$ and $D_{48}$ connected to the transformer secondary, and a filter network including $R_{44}$, $R_{45}$, $C_{45}$ and $C_{46}$. Diodes $D_{41}$ and $D_{42}$ in combination with a filter circuit including $R_{40}$, $C_{41}$ and $C_{42}$ provide a positive potential to the collector of transistor $Q_{48}$. The center tap of the $T_{11}$ secondary winding is connected to ground.

The input to the circuit of FIGURE 4 is provided by temperature sensing means embodied as a thermistor $N_{41}$ located in the device whose temperature is to be controlled. This thermistor constitutes one section of a bridge network which is balanced for zero output at the correct temperature. A deviation in temperature causes a bridge unbalance and the resultant output is amplified by preamplifier $Q_{42}$–$Q_{43}$ and used to switch transiently regenerative amplifier $Q_{44}$–$Q_{45}$ into the state corresponding to the direction of bridge unbalance.

The potential supplied across the temperature-sensitive bridge network is regulated by a zener diode $D_{49}$ which is in series with a resistor $R_{70}$ across the negative D.C. supply potential, conveniently −20 v. D.C. The action of diode $D_{49}$ reduces the effects of A.C. components in the negative supply. The temperature-sensitive bridge is in parallel with $D_{49}$ and comprises two legs from ground potential to the regulated negative potential present at the junction of $D_{49}$ and resistor $R_{70}$. One leg consists of resistors $R_{74}$ and $R_{75}$ in series, with the base of preamplifier transistor $Q_{43}$ connected to the junction thereof. The other leg comprises thermistor $N_{41}$, which is connected between ground and the base of $Q_{42}$, and resistors $R_{71}$ and $R_{72}$ in series with $N_{41}$ and connected between the base of $Q_{42}$ and the negative potential at the zener diode anode.

The emitters of the bridge preamplifier transistors $Q_{42}$ and $Q_{43}$ are connected together and returned to the −20 v. D.C. negative supply potential through common emitter resistor $R_{73}$. The collectors of $Q_{42}$ and $Q_{43}$ supply output currents to the base-emitter circuits of regenerative amplifier $Q_{44}$–$Q_{45}$.

The temperature-sensitive bridge is adjusted by means of potentiometer $R_{72}$ for balance at the desired temperature affecting thermistor $N_{41}$. A deviation from the desired temperature changes the resistance of thermistor $N_{41}$ from the balance value, and the bridge becomes unbalanced. The potentials at the respective bases of the preamplifier transistors $Q_{42}$ and $Q_{43}$ are then no longer equal with respect to their emitters, and the collector current in one transistor will be greater than that of the other. Accordingly the output of the preamplifier is unbalanced and greater base-emitter current will flow in the appropriate regenerative amplifier transistor. For example, if the thermistor resistance decreases, the potential drop across the thermistor similarly decreases and the base of transistor $Q_{42}$ becomes less negative or in other words more positive. As a result, increased base-emitter current flows through $Q_{42}$, thus also an increased collector current flows through $Q_{42}$. This increase in $Q_{42}$ collector current flows through resistances $R_{56}$ and $R_{54}$ to the positive supply potential point E+ causing the base of transistor $Q_{44}$ to become more negative. Less base-emitter current flows through transistor $Q_{44}$ as a consequence. Similarly, the unbalance in the preamplifier bridge resulting from a decrease in thermistor resistance will cause a lesser collector current to flow through transistor $Q_{43}$, and a greater base-emitter current consequently through transistor $Q_{45}$. As noted more fully hereinafter, the activation of the regenerative amplifier $Q_{44}$, $Q_{45}$ is effected by the ungrounding of the arm of a potentiometer $R_{65}$. The regenerative amplifier will then regenerate into the condition in which transistor $Q_{45}$ is fully saturated and $Q_{44}$ is cut off.

The inputs to transiently regenerative amplifier $Q_{44}$–$Q_{45}$ are supplied via direct connection from the collectors of $Q_{42}$ and $Q_{43}$, respectively. The emitters of transistors $Q_{44}$ and $Q_{45}$ are connected together and returned via $R_{62}$ to the negative D.C. operating potential at E−. The collectors of $Q_{44}$ and $Q_{45}$ are returned through respective serial resistance branches $R_{58}$, $R_{60}$ and $R_{59}$, $R_{67}$ to E+. A clamp transistor $Q_{46}$ parallels $R_{67}$ in the $Q_{45}$ collector return. The bases of $Q_{44}$ and $Q_{45}$ are returned through resistances $R_{56}$ and $R_{57}$ respectively to a biasing point at the intermediate junction of voltage divider $R_{54}$, $R_{55}$ connected between E+ and E−. The base of $Q_{45}$ is also returned through resistance $R_{61}$ to the arm of potentiometer $R_{65}$ which is in the divider comprising serial elements $R_{63}$, $R_{64}$, $R_{65}$ and $R_{66}$ between E+ v. D.C. and E−. Potentiometer $R_{65}$ is adjusted for quiescent operating current balance between $Q_{44}$ and $Q_{45}$.

Regenerative amplifier $Q_{44}$–$Q_{45}$ includes regeneration control means for controlling periodic regeneration therein. It may be remembered that in the case of the embodiments of FIGURES 1, 2 and 3 unfiltered power supply potential provided such means. In the case of the circuit of FIGURE 4, the power supply is filtered. The enabling and disabling functions are furnished by a separate chopper circuit which operates at the desired enabling frequency and which periodically interrupts the regenerative feedback circuit of $Q_{44}$–$Q_{45}$ thereby disabling it. A new regenerative period occurs each time the interruption ceases.

The regeneration control circuit includes diodes $D_{43}$ and $D_{44}$ which provide full-wave rectification of the A.C. power at the secondary of transformer $T_{11}$. The output is taken from the junction of their anodes, and is a pulsating D.C., negative with respect to the grounded center tap of the $T_{11}$ secondary.

This pulsating D.C. is applied across a resistor $R_{43}$, which along with serial resistances $R_{46}$ and $R_{48}$ comprise a divider between E+ and E− (unfiltered). The resultant potential appearing at the junction of $R_{46}$ and $R_{48}$ includes the negative-going pulsating signal of $R_{43}$ and the positive reference level at the junction. This signal is connected to the base of a synchronizing transistor $Q_{41}$ having a grounded emitter. Therefore, at times between half-cycles of the $T_{11}$ output, the base of $Q_{41}$ becomes slightly positive with respect to its emitter, providing a reverse bias for cutting off collector current through $Q_{41}$.

While transistor $Q_{41}$ is cut off, the cathode of diode $D_{50}$ is consequently held negative with respect to ground by the voltage divider comprising $R_{49}$, $R_{50}$ and $R_{47}$, connected between E+ and E−. The cathode of $D_{50}$ is connected to the junction of $R_{49}$ and $R_{50}$ and being energized when $Q_{41}$ is cut off, it permits current flow in the base-emitter circuit of chopper transistor $Q_{49}$. This base-emitter current is sufficient to cause current flow in the emitter-collector circuit from ground into the emitter of $Q_{49}$ to the arm of potentiometer $R_{65}$, reducing the potential drop between the arm and ground to a low value. Thus the arm is effectively grounded. This effective grounding interrupts the regenerative feedback loop of amplifier $Q_{44}$–$Q_{45}$, which loop includes the path embracing the collector of $Q_{44}$, diode $D_{51}$, $R_{64}$, part of $R_{65}$, the base-emitter of $Q_{45}$ and the base-emitter of $Q_{44}$. By effectively grounding the arm of $R_{65}$, regeneration cannot take place in $Q_{44}$–$Q_{45}$, and the circuit is thus disabled.

When the negative pulse applied to $R_{43}$ begins its cycle, the junction of $R_{46}$, $R_{48}$ becomes more negative; when this point drops below ground the base of $Q_{41}$ is driven negative with respect to its grounded emitter. Current then starts to flow in the base-emitter circuit thereof, causing collector current to flow through $Q_{41}$; this action places the collector at approximately the same potential as the grounded emitter. The collector is connected to the junction of $R_{50}$ and $R_{47}$; $R_{50}$ and $R_{49}$ in series therewith are thus placed between effective ground and E+. Therefore, the junction of $R_{50}$ and $R_{49}$, to which the cathode of $D_{50}$ is connected, becomes positive relative to ground. Current thus cannot flow through $D_{50}$ since its anode is held at the lower potential occuring at the mid-point of divider $R_{51}$–$R_{52}$ which is connected across the E+, E− supply. When no current flows through $D_{50}$ a positive potential results at the base of $Q_{49}$ cutting off collector current flow therein. Thus $Q_{49}$ becomes a high impedance and no longer loads the regenerative feedback loop of $Q_{44}$–$Q_{45}$. At that time, regeneration is free to commence therein. The polarity of the net input signal from the temperature-sensitive bridge preamplifier $Q_{42}$–$Q_{43}$ determines the regenerated state.

The operation of transiently regenerative amplifier $Q_{44}$–$Q_{45}$ is as follows: At the time transistor $Q_{49}$ is cut off, the arm of potentiometer $R_{65}$ is effectively ungrounded, and the regenerative feedback circuit of $Q_{44}$–$Q_{45}$ is free to operate. Depending upon the unbalance of the signals supplied from the collectors of preamplifier $Q_{42}$–$Q_{43}$, the resultant potentials at respective bases of $Q_{44}$–$Q_{45}$ are similarly unequal. If the bridge is positive at the base of $Q_{42}$, greater collector current flows through $Q_{42}$, $R_{56}$, and $R_{54}$ to E+ thereby making the base of $Q_{44}$, connected to the collector of $Q_{42}$, more negative than the base of $Q_{45}$. Reduced base-emitter current through $Q_{44}$ is the result, and a lesser collector current flows in the $Q_{44}$ emitter-collector circuit comprising $R_{62}$ as a common emitter return for $Q_{44}$ and $Q_{45}$, and $R_{58}$ and $R_{60}$ connected from the $Q_{44}$ collector to E+. Diode $D_{51}$ and resistance $R_{63}$ are in series, shunting $R_{58}$-$R_{60}$. This decrease in $Q_{44}$ collector current causes the collector to become more positive, and the potential is coupled from the collector of $Q_{44}$ through $D_{51}$ to the junction of $R_{63}$ and $R_{64}$ in divider $R_{63}$, $R_{64}$, $R_{65}$, and $R_{66}$ connected between E+ and E−. The positive-going potential at the junction of $R_{63}$, $R_{64}$ causes the potential at the arm of $R_{65}$ to become relatively more positive; the arm potential is coupled through $R_{61}$ to the base of $Q_{45}$. An increase in $Q_{45}$ base-emitter current results along with a consequent increase in emitter-collector current. This emitter-collector current increase is amplified by $Q_{45}$, and thus is greater in magnitude than the $Q_{44}$ emitter current decrease earlier mentioned. The emitter currents of $Q_{44}$ and $Q_{45}$ both flow through $R_{62}$, and the preponderance of the $Q_{45}$ increase causes the common emitters to become more positive. The emitter-collector current through $Q_{44}$ consequently decreases still further than the reduction originated by the bridge preamplifier unbalance signal. That further collector current decrease through $Q_{44}$ causes its collector to become more positive, which potential is again coupled through $D_{51}$, $R_{64}$, $R_{65}$, and $R_{61}$ back to the base of $Q_{45}$, causing a further increase in base-emitter and emitter-collector current through $Q_{45}$.

This action continues to circulate about the regenerative loop described until $Q_{44}$ is cut off and the $Q_{45}$ collector current is saturated. This particular regenerated condition occurs given an increased current output from preamplifier transistor $Q_{42}$. If instead, the $Q_{42}$ output current decreased, regeneration of $Q_{44}$-$Q_{45}$ would occur in the opposite direction, resulting in a saturation of $Q_{44}$ and a cut-off of $Q_{45}$. The output of transiently regenerative amplifier $Q_{44}$-$Q_{45}$ is taken from the junction of $R_{59}$ and $R_{67}$, clamp transistor $Q_{46}$ being in shunt with $R_{67}$, in the $Q_{45}$ collector return to E+.

The emitter of clamp transistor $Q_{46}$ is connected to E+ and the base of $Q_{46}$ is connected to the junction of $R_{58}$ and $R_{60}$ in series relation with the collector of $Q_{44}$. When no $Q_{44}$ collector current flows, the potential drop across $R_{60}$ is minimal, making the base of clamp $Q_{46}$ approximately the same potential as its emitter. Under that condition clamp transistor $Q_{46}$ is a high impedance, and the $Q_{45}$ collector current flows to a greater extent through $R_{67}$ in parallel with the base-emitter circuit of switch transistor $Q_{47}$. This $Q_{45}$ current turns $Q_{47}$ on, allowing maximum collector current to flow therein.

During the other two possible conditions of amplifier $Q_{44}$-$Q_{45}$, namely the condition of current balance between regenerative enabling, and the condition where $Q_{44}$ is in saturation and $Q_{45}$ is cut off, appreciable collector current from $Q_{44}$ flows through $R_{60}$, forwardly biasing $Q_{46}$.

When current flows in the base-emitter circuit of clamp $Q_{46}$ it becomes a low impedance, and the $Q_{46}$ collector is effectively placed at the same potential as its emitter, i.e., E+. The base of switch transistor $Q_{47}$, connected to the collector of $Q_{46}$, is thus also at E+. Since the $Q_{47}$ emitter is connected to E+, no base-emitter current flows through $Q_{47}$ at this time, and $Q_{47}$ collector current is cut off.

In this manner, when the regenerative amplifier $Q_{44}$-$Q_{45}$ is either transiently balanced or when transistor $Q_{44}$ is regeneratively saturated, switch transistor $Q_{47}$ is cut off. Only in the regenerative state of the amlpifier wherein transistor $Q_{45}$ is saturated is transistor $Q_{47}$ conducting.

The collector of $Q_{47}$ is connected to the base of output switch transistor $Q_{48}$. The collector of switch transistor $Q_{48}$ is conveniently returned to a positive D.C. supply potential one or two volts higher than the E+ potential at the emitter of transistor $Q_{47}$. Thus when switch transistor $Q_{47}$ conducts collector current, the base of output switch transistor $Q_{48}$, directly connected to the collector of $Q_{47}$, becomes more positive, being effectively at E+. In this condition, base-emitter current flows through $Q_{48}$, allowing the emitter-collector circuit of $Q_{48}$ to conduct heavily to the higher voltage bus. An output circuit is connected to the $Q_{48}$ emitter circuit via a resistance $R_{69}$, the other output terminal being ground. Hence, when $Q_{48}$ conducts, energizing current is delivered to the output circuit. This energizing output current thus flows only at times amplifier transistor $Q_{45}$ is regeneratively saturated, and at all other times is at a minimum.

Two feedback networks are provided, an in-phase feedback network comprising resistors $R_{80}$ and $R_{81}$ together with capacitor $C_{48}$ is connected between the collector of switch transistor $Q_{47}$ and the base of preamplifier transistor $Q_{42}$; an out-of-phase feedback network comprising resistors $R_{78}$ and $R_{79}$ together with capacitor $C_{47}$ is connected from the same point, the collector of $Q_{47}$, to the base of preamplifier transistor $Q_{43}$.

In this circuit the in-phase feedback functions similarly to the in-phase feedback of the circuit depicted in FIGURES 1, 2 and 3. Capacitor $C_{48}$ has a relatively small storage value, thus providing only a slight delay in the application of the in-phase signal. Similarly, as in the circuit of FIGURE 3, resistor $R_{81}$ is of relatively large value thus significantly attenuating this slightly delayed in-phase feedback. The result is a latching type of feedback which is impressed upon the preamplifier circuit immediately after the regenerative switching to provide a tendency to regenerate the circuit into the same switched condition upon the next enabling cycle from the chopper circuit.

The out-of-phase feedback circuit, as in the circuit of FIGURE 3, employs a relatively large storage capacitor, thus delaying this feedback appreciably. Resistor $R_{79}$ is approximately a third of the resistance of the analogous resistor $R_{81}$ in the in-phase circuit. Thus the delayed out-of-phase feedback level is attenuated less, appreciably exceeding that of the in-phase level.

In a manner similar to that described in connection with the circuit of FIGURE 3, the delayed out-of-phase feedback increases over several enabling cycles and eventually reaches a level that cancels the in-phase feedback. The now predominating out-of-phase feedback network then impresses a resultant signal upon the preamplifier of a polarity opposite to the input signal polarity which originally switched the amplifier into its most recent train of regenerated states. When this new resultant signal occurs, the next enabling cycle causes the amplifier to switch into its alternate state.

In this manner, and as depicted in FIGURES 3A–3F, the regenerative amplifier produces a train of regenerated states of one condition, then, when the out-of-phase feedback exceeds the combination of the in-phase feedback and the input signal (assuming an input small enough to be overcome) the regenerative amplifier switches into its alternate state and produces a new train of similarly regenerated states of opposite polarity which continue until switching back again occurs. When the out-of-phase delayed feedback goes in one direction it must oppose and cancel the in-phase signal *plus* the input signal; in the other direction, cancellation of the in-phase signal minus the input signal is required. In other words, the input signal aids the out-of-phase feedback in one direction and opposes it in the other. As a consequence, the out-of-phase feedback cancels the combination more quickly when the input aids it, thus causing production of shorter train of regenerated pulses of one state. Similarly, the out-of-phase feedback takes longer to cancel the combination when the input opposes it, thus causing production of a longer train of pulses of the alternate state.

It should be noted that the output of FIGURE 4 comprises a train of pulses which in addition to being synchronized with the A.C. source frequency is also substantially in phase therewith. The pulses thus serve particularly well as control pulses for load-controlling switch devices connected to the A.C. source since the switching of these latter devices will occur during low voltage intervals whereby transients and dissipation are reduced.

Figure 5:
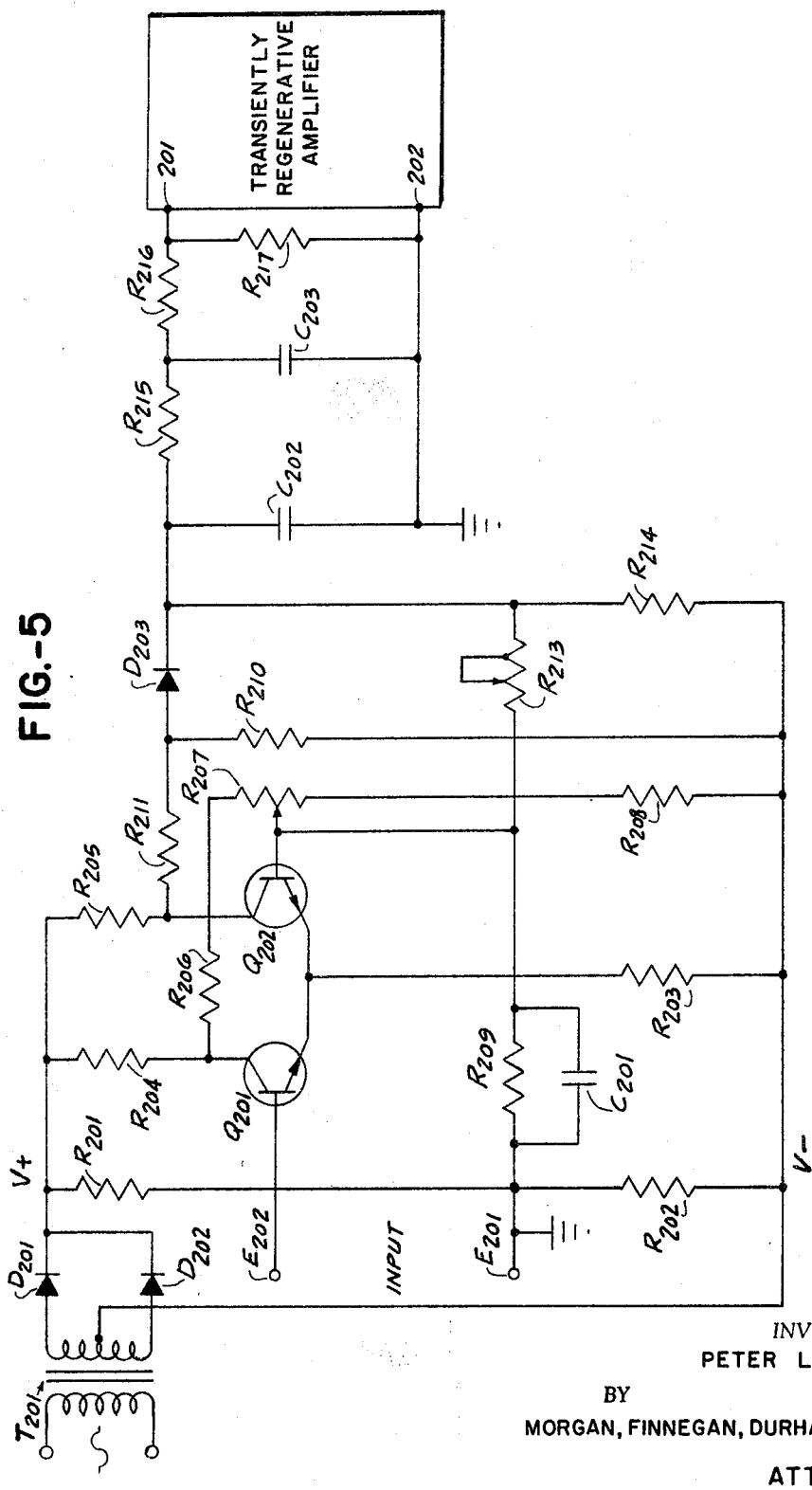
FIGURE 5 is a schematic diagram of a transiently regenerative amplifier employing out-of-phase feedback for effecting linearized operation.

Referring to the schematic of FIGURE 5, there is shown therein a transiently regenerative amplifier employing out-of-phase stored feedback to achieve certain linear response characteristics. The circuit includes a power supply, a transiently regenerative amplifier, a stored out-of-phase feedback circuit, an integrating circuit, and, in block form, a second transiently regenerative amplifier such as shown in FIGURE 1.

The power supply comprises $T_{201}$ with a center tap forming terminal V— and diodes $D_{201}$ and $D_{202}$ having their cathodes connected to terminal V+. Pulsating D.C. potential to the transiently regenerative amplifier $Q_{201}$–$Q_{202}$ is provided by the power supply.

The transiently regenerative amplifier comprising transistors $Q_{201}$ and $Q_{202}$ functions in a manner similar to those amplifiers described in connection with the circuits of FIGURES 1, 2 and 3. That is, the pulsating D.C. potential supplied from the power supply at V+ and V— activates the transiently regenerative amplifier each half cycle.

Signal input terminal $E_{201}$ is grounded, and terminal $E_{202}$ is connected directly to the base of amplifier transistor $Q_{201}$. The base of amplifier transistor $Q_{202}$ is returned to ground through the parallel combination of $R_{209}$ and $C_{201}$. The signal ground point is connected to the midpoint of a divider $R_{201}$, $R_{202}$ connected between V+ and V—.

A positive potential at the input base of transistor $Q_{201}$ results in increased base-emitter current through $Q_{201}$, and consequently increased collector current through $Q_{201}$, through common emitter resistor $R_{203}$, and through collector resistor $R_{204}$. The resulting negative-going potential from the collector of $Q_{201}$ is coupled through $R_{206}$ and potentiometer $R_{207}$ to the base of $Q_{202}$. A regenerative action such as hereinbefore described thereby occurs with transistor $Q_{201}$ becoming saturated in a full-on condition and transistor $Q_{202}$ being cut off.

Conversely, a negative potential at the base of transistor $Q_{201}$ will initiate regeneration of $Q_{201}$–$Q_{202}$ into the opposite state, wherein $Q_{201}$ is cut off and $Q_{202}$ is saturated full-on.

One end of potentiometer $R_{207}$ is connected through $R_{208}$ to V—, thus providing a range of adjustment about ground potential for balancing $Q_{201}$ and $Q_{202}$.

The output of the transiently regenerative amplifier is coupled from the collector of $Q_{202}$, through $R_{211}$ and isolating diode $D_{203}$ to feedback storage capacitor $C_{202}$; the out-of-phase feedback is coupled from $C_{202}$ through $R_{213}$ back to the base of transistor $Q_{202}$. This delayed out-of-phase feedback causes the transiently regenerative amplifier to periodically produce output pulses of polarity opposite to that initially produced by the input signal.

Each enabling pulse from the power supply places the transiently regenerative amplifier into a switching state determined by the cooperation of the input signal at the base circuits of $Q_{201}$ and $Q_{202}$ with the out-of-phase feedback signal supplied from capacitor $C_{202}$ through resistor $R_{213}$ to the base circuits. The resultant preferred state is determined by the polarity of the input signal until such time as the delayed out-of-phase feedback level cancels out the opposing input signal level, thus becoming the preponderant signal input to the amplifier. At that time, the next enabling pulse from the power supply will result in saturation of the amplifier in its non-preferred, opposite state, producing a minority pulse output.

Switching into the minority state initiates the beginning of a corresponding delayed feedback having a tendency to aid the input signal. Before this positive feedback can begin, $C_{202}$ must first discharge sufficiently so as to be overcome by the input. Depending upon the extent to which $C_{202}$ was thus charged, the time to discharge sufficiently may be of a duration covering one or more minority pulses which can therefore occur before the amplifier is switched back into the preferred or majority state. Inasmuch as the input signal polarity favors the majority state, $C_{202}$ need only discharge to the point where the input predominates. Once the charge on $C_{202}$ reaches the state of equilibrium where it is of comparable effectiveness with the input to cause switching to the non-preferred state, then the output will oscillate with the number of pulses of one polarity being in a ratio with the opposite polarity pulses according to the level of input signal.

The overall effect of this action is seen to be the development of a voltage on $C_{202}$ which is related to input signal amplitude. This capacitor voltage is filtered by network $R_{215}$, $C_{203}$ and $R_{216}$. The network output is a D.C. level having a polarity and magnitude of the input signal. Thus, the circuit of FIGURE 5 effects a linear amplification of the input signal.

The linear response in FIGURE 5 has many uses where linear amplification is desired. For example, the circuit may be employed as a preamplifier. Thus for illustration, the linear output is used to supply an input to a simple transiently regenerative amplifier circuit, such as shown in FIGURE 1, the input being first applied to $R_{217}$. The output of the combination, which affords a high degree of sensitivity, is then a switched state corresponding to the polarity of the signal across $R_{217}$.

Diode $D_{203}$ isolates the $Q_{202}$ collector circuit from the effect of current flow through storage feedback capacitor $C_{202}$, thus preventing undue interference by $C_{202}$ during regenerative enabling times.

Resistor $R_{210}$ holds the anode of $D_{203}$ at a relatively low potential between enabling times so that when enabling commences, the potentials applied to the regenerative amplifier do not immediately start conduction through $D_{203}$. In this manner, the amplifier starts to regenerate into a particular state before the amplifier is loaded by output current which would otherwise alter the response of the amplifier.

By varying the value of $R_{213}$, the amount of feedback to the base of $Q_{202}$ is controlled. By having a very low amount of feedback, a longer train of majority pulses occurs before the input is overcome by the feedback. As the minority train next commences, $C_{202}$ discharges at a certain rate to the point where the input signal takes over again. The filtered output is of increased amplitude, thereby thus reducing the out-of-phase feedback effecting increases the gain of the linear amplifier. Conversely, increasing the amount of feedback reduces the effective gain, inasmuch as the greater the feedback, the larger the tendency of the circuit to produce equal numbers of majority and minority pulses.

If the negative feedback time constant is substantially reduced so as to be relatively fast, examination will show that the circuit of FIGURE 5 is transformed into a null oscillator.

Figure 6:
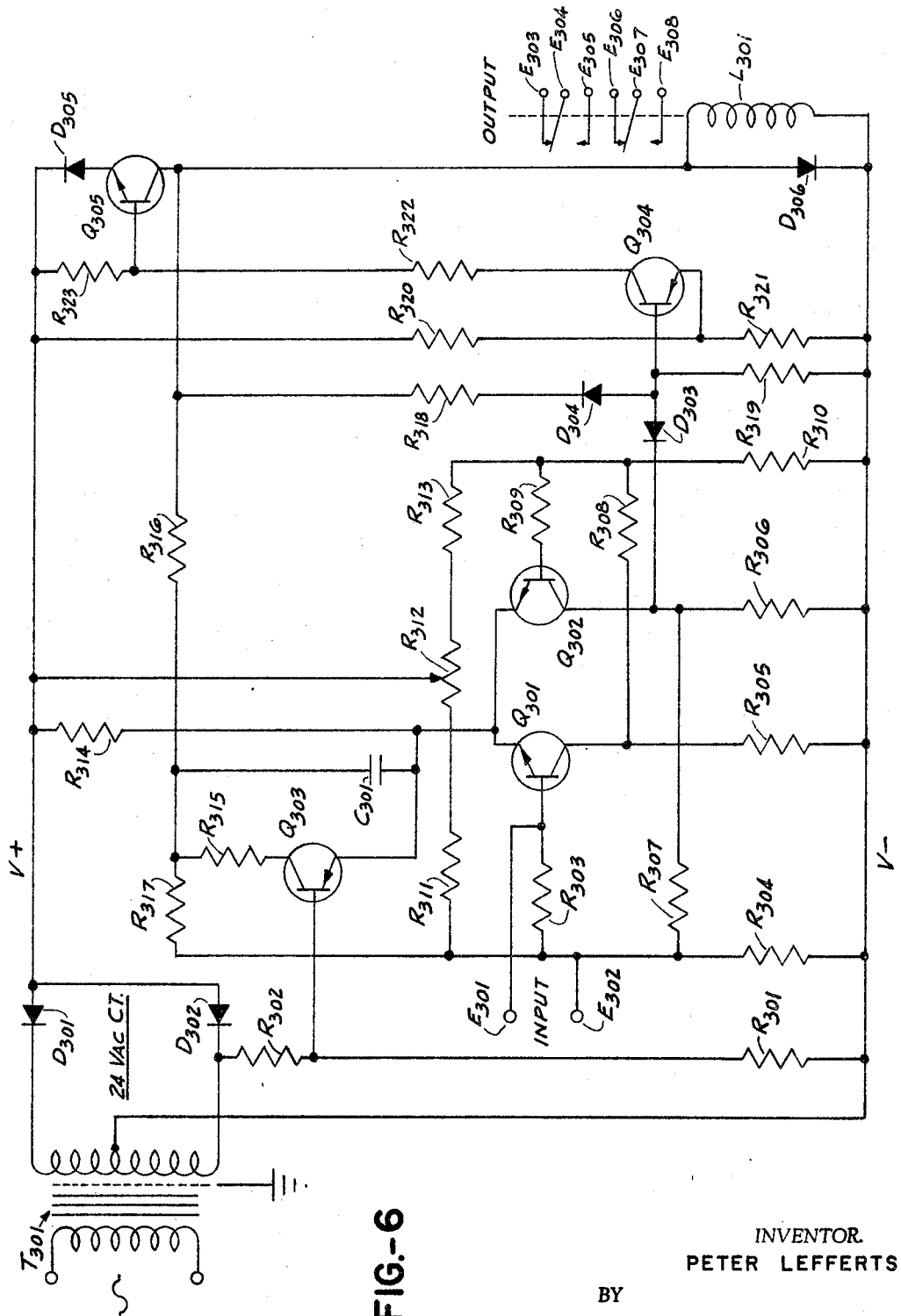
FIGURE 6 is a schematic diagram of a transiently regenerative amplifier employing an in-phase feedback circuit for effecting phase sensitivity.

The circuit of FIGURE 6 is a phase-sensitive signal detector employing in-phase feedback. This circuit includes a power supply, a regenerative amplifier, an output relay energizing circuit, a response varying feedback circuit and control means acting on the feedback circuit to render modifying feedback effective during alternate regenerative periods.

An input signal is supplied to regenerative amplifier $Q_{301}$–$Q_{302}$. The amplifier $Q_{301}$–$Q_{302}$ is regenerated each half-cycle of power supply operation. The switched output of $Q_{302}$ is applied to relay energizer circuit $Q_{304}$–$Q_{305}$. A large amount of in-phase feedback is supplied from relay driver $Q_{305}$ back to the input circuit. The feedback circuit includes a shunting transistor $Q_{303}$ which operates to shunt a feedback storage capacitor $C_{301}$ every other half cycle of power supply operation. Consequently, the input is heavily latched during one regenerative period and substantially re-sensitized during the next period, this occurring in regular alternation.

The power supply comprises $T_{301}$ with rectifiers $D_{301}$ and $D_{302}$ connected in full-wave configuration thereto; the center tap of $T_{301}$ is connected to the V+ positive bus, and the anodes of $D_{301}$, $D_{302}$ are connected together and tied to the negative bus, V—. The power supply output across V—, V+ consists of unfiltered pulsating D.C. having a frequency twice that of the power source at the primary of $T_{301}$. The pulsating D.C. goes to a zero potential after each half-cycle.

Transiently regenerative amplifier $Q_{301}$–$Q_{302}$ is periodically enabled by the supply bus potential. The associated circuitry is in a balanced configuration.

A common emitter resistor $R_{314}$ is connected from the V— bus to the connected emitters of $Q_{301}$ and $Q_{302}$. The collectors are returned through $R_{305}$ and $R_{306}$ respectively to the V+ bus. A double divider circuit across the rectifier output balances the nominal base potentials of $Q_{301}$ and $Q_{302}$. A first branch comprises serially-connected resistors $R_{304}$, $R_{311}$ and a portion of potentiometer $R_{312}$ to its tap, the latter being connected to V+; the second leg comprises $R_{310}$, $R_{313}$ and the remaining portion of $R_{312}$ to its tap. The junction of $R_{304}$ and $R_{311}$ in the first branch is connected through $R_{303}$ to the base of $Q_{301}$; this junction is also connected to input terminal $E_{302}$ and via $R_{307}$ to the collector of $Q_{302}$. The junction of $R_{310}$ and $R_{313}$ is coupled through $R_{309}$ to the base of $Q_{302}$. Input $E_{301}$ is connected directly to the base of $Q_{301}$.

The junction of $R_{310}$ and $R_{313}$ in the second divider is also coupled through $R_{308}$ to the collector of $Q_{301}$. The output of the regenerative amplifier is taken from the collector of $Q_{302}$ and coupled via isolating diode $D_{303}$ to the base of $Q_{304}$.

For producing output relay actuation, the potential applied to terminal $E_{301}$ connected to the base of $Q_{301}$ is negative with respect to the potential at terminal $E_{302}$. A negative potential at the $Q_{301}$ base tends to reduce $Q_{301}$ base-emitter current when the enabling cycle commences. Consequently $Q_{301}$ collector current is lower than it would be in a balanced condition, and the collector potential coupled through $R_{308}$ and $R_{309}$ to the base of $Q_{302}$ is high. This potential causes increased base-emitter current in $Q_{302}$ and therefore higher collector current therein. The resultant negative-going collector potential of $Q_{302}$ is coupled through $R_{307}$ and $R_{303}$ back to the base of $Q_{301}$. The negative-going potential reinforces the original negative input to the base of $Q_{301}$, and consequently the $Q_{301}$–$Q_{302}$ circuit regenerates until $Q_{302}$ is saturated and $Q_{301}$ is cut-off. Regeneration occurs early in the power supply cycle and with only a very small potential on the $Q_{301}$–$Q_{302}$ collectors. The saturated state lasts until the end of the cycle, whereupon energizing potentials return to zero.

The $Q_{301}$–$Q_{302}$ output, for the negative-going input at $E_{301}$, consists of the negative-going pulse at the $Q_{302}$ collector. This negative-going output reduces the cathode potential of $D_{303}$ sufficiently below that of its anode to start conduction. The $D_{303}$ anode is coupled through $R_{319}$ to V+, and also serially through $D_{304}$ and $R_{318}$ to the collector of relay output transistor $Q_{305}$. Current through $D_{303}$ flows in the base-emitter circuit of $Q_{304}$ via $R_{321}$ which is connected from the emitter of $Q_{304}$ to V+. Resistor $R_{320}$ connects the $Q_{304}$ emitter to V—, maintaining the emitter below V+ so that $Q_{304}$ is cut off when its base is effectively at the V+ potential, as when $D_{303}$ is back biased.

With base-emitter current flowing, the $Q_{304}$ collector current increases through the circuit of $R_{323}$ and $R_{322}$. The base of $Q_{305}$, connected to the junction of $R_{323}$–$R_{322}$, thus goes positive, base-emitter current flows, and current increases through the $Q_{305}$ emitter-collector circuit comprising $D_{305}$, the $Q_{305}$ emitter-collector, and $L_{301}$, all serially connected V— and V+. As a consequence, $L_{301}$ is energized and produces the switched output corresponding to a negative input at $E_{301}$.

When $Q_{305}$ conducts, the potential at its collector goes negative, and additional current flows through the base-emitter of $Q_{304}$, also flowing through $R_{304}$ and $D_{304}$. This provides a reinforcing effect whereby $Q_{304}$ and $Q_{305}$ are positively saturated.

For a positive input at $E_{301}$, $Q_{301}$ and $Q_{302}$ regenerate into the alternate state wherein $Q_{302}$ is cut off. The $Q_{302}$ output is then positive, the cathode of $D_{303}$ is biased positively with respect to its anode and is thus non-conducting. No energizing signal is impressed upon the $Q_{304}$ base, and the $L_{301}$ relay remains de-energized.

Diode $D_{303}$ preferably has a relatively high level threshold. Thus, at the instant $Q_{301}$–$Q_{302}$ is first energized, $D_{303}$ is non-conducting; this acts to isolated the $Q_{302}$ collector from loading effects and allows regeneration into the appropriate state to occur uninfluenced by the conditions of the output circuits.

The stored feedback circuit is connected from the collector of $Q_{305}$ through network resistances $R_{316}$ and $R_{317}$ to $E_{302}$. Feedback storage capacitor $C_{301}$, paralleled by $R_{315}$ and the collector-emitter circuit of $Q_{303}$ in series, is connected between the junction of $R_{316}$ and $R_{317}$ and the emitters of $Q_{301}$ and $Q_{302}$. The base of $Q_{303}$ is connected through $R_{301}$ to V+, and through $R_{302}$ to the cathode of power rectifier $D_{302}$.

The potential at the collector of $Q_{305}$ is attenuated by $R_{316}$, stored in and delayed by $C_{301}$, further attenuated by $R_{317}$, and applied through $R_{303}$ to input $E_{301}$ (the base of $Q_{301}$). For the assumed negative input at $E_{301}$, this feedback is also negative, i.e., is in-phase with the input signal. For the illustrated response, the capacity of $C_{301}$ is relatively large although the overall time constant is relatively short. The feedback network is designed to apply a large feedback potential to the base of $Q_{301}$ when $Q_{303}$ is non-conducting. Thus, a very large latching effect is obtained, requiring an extremely strong input signal to produce an alternate state. This action occurs during alternate regenerative periods under control of shunting transistor $Q_{303}$ which is non-conducting during half-cycles when its base is held positive by $R_{301}$ and $R_{302}$. During each next half-cycle, the base is made negative, causing $Q_{303}$ to conduct.

When $Q_{303}$ is non-conducting, $C_{301}$ stores a charge over an enabling cycle and thus has a relatively large charge on it at the beginning of the next enabling cycle, which charge provides the latching effect.

When $Q_{303}$ conducts, the charge on $C_{301}$ is dissipated except to the extent $R_{315}$ preserves a residual small charge. This leaves a condition wherein the next regeneration of $Q_{301}$ and $Q_{302}$ finds a small amount latching at the $Q_{301}$ base; this latching does not defeat the circuit sensitivity to low level inputs. In this manner, sensitive half-cycles alternate with latched cycles. Thus phase detection is attainable, the output polarity depending on the phase relation of the input signal and the regeneration switching signal. Also, the effect of spurious inputs synchronized with the power supply may be minimized. Thus, detection of low level D.C. swamped by hum is facilitated and relay chattering minimized.

The foregoing embodiments are intended to be exemplary only. Other circuit configurations and applications will undoubtedly occur to those skilled in the art. The invention is accordingly not limited to the specific mechanisms shown and described, but departures may be made therefrom within the scope of the accompanying claims without sacrificing its chief advantage or varying from the spirit thereof.

What is claimed is:

1. A highly sensitive signal translating circuit comprising
   an amplifier including
      an input circuit for receiving an electrical parameter to be sensed,
      an output circuit for supplying a response indicative of said electrical parameter, and
      at least one stage between said input circuit and said output circuit;
   a positive feedback loop coupled to said amplifier for regeneratively driving the same into a saturated state related to said electrical parameter when activated;
   a feedback control means coupled to said positive feedback loop for periodically activating and impairing the regeneration of said feedback loop over successive time intervals short compared with said electrical parameter;
   signal storage means being coupled to said output circuit for storing a signal related to the saturated state of said amplifier; and
   circuit means for coupling said signal storage means to the input of one stage in said amplifier to bias said amplifier in accordance with a saturated state resulting during a previous activation of said feedback circuit.

2. A circuit according to claim 1 further comprising a pulsating power supply for said amplifier and in which said feedback control means comprises said power supply.

3. A circuit according to claim 1 wherein said signal storage means and said coupling circuit means apply a signal to said amplifier which is in-phase with the portion of said electrical parameter causing said signal.

4. A circuit according to claim 1 wherein said signal storage means and said coupling circuit means apply a signal to said amplifier which is out-of-phase with the portion of said electrical parameter causing said signal.

5. A highly sensitive signal translating circuit comprising
   an amplifier including
      an input circuit for receiving an electrical parameter to be sensed,
      an output circuit for supplying a response indicative of said electrical parameter, and
      at least one stage between said input circuit and said output circuit;
   a positive feedback lop coupled to said amplifier for regeneratively driving the same into a saturated state related to said electrical parameter when activated;
   a feedback control means coupled to said positive feedback loop for periodically activating and impairing the regeneration of said feedback loop over successive time intervals short compared with said electrical parameter;
   a storage capacitor; and
   a pair of resistors coupled between the output of said output circuit and the input of one stage in said amplifier, said capacitor being connected to the junction between said resistors;
   said capacitor and said resistors being so interconnected that said capacitor stores a signal related to the saturated state of said amplifier and subsequently biases said amplifier in accordance with said stored signal.

6. The circuit accordang to claim 5 wherein said resistors are connected across an even number of amplifier stages.

7. The circuit according to claim 5 wherein said resistors are connected across an odd number of amplifier stages.

8. A highly sensitive signal translating circuit comprising
   an amplifier including
      an input circuit for receiving an electrical parameter to be sensed,
      an output circuit for supplying a response indicative of said electrical parameter, and
      at least one amplifying stage between said input and output circuits;
   a positive feedback loop coupled to said amplifier for regeneratively driving the same into a saturated state related to said electrical parameter when activated;
   a feedback control means coupled to said positive feedback loop for periodically activating and impairing the regeneration of said loop over successive time intervals short compared with said electrical parameter;
   signal storage means connected to said output circuit for storing a signal related to said electrical parameter; and
   circuit means coupling said signal storage means to the input of one stage of said amplifier to bias said amplifier in aiding relation to said electrical parameter if said parameter remains the same during successive activations of said positive feedback loop.

9. A highly sensitive translating circuit in accordance with claim 8 wherein said feedback control means and said circuit means are isolated from said input circuit.

10. A highly sensitive translating circuit in accordance with claim 9 further comprising a pulsating power source and wherein said pulsating power source is said feedback control means.

11. The circuit according to claim 8 wherein the combination of said storage means and coupling circuit means delays application of a signal from said output circuit to said input of one stage for a period of time less than that between successive activations by said feedback control means.

12. The circuit according to claim 8 wherein the combination of said storage means and coupling circuit means delays application of a signal from said output circuit to said input of one stage for a period of time substantially greater than that between successive activations by said feedback control means.

13. A highly sensitive signal translating circuit comprising
   an amplifier including
      an input circuit for receiving an electrical parameter to be sensed,
      an output circuit for supplying a response indicative of said electrical parameter, and
      at least one amplifying stage between said input and output circuits;
   a positive feedback loop coupled to said amplifier for regeneratively driving the same into a saturated state related to said electrical parameter when activated;
   a feedback control means coupled to said positive feedback loop for periodically activating and impairing the regeneration of said loop over successive time intervals short compared with said electrical parameter;
   signal storage means connected to said output circuit for storing a signal related to said electrical parameter; and
   circuit means coupling said signal storage means to the input of one stage of said amplifier to bias said amplifier in opposing relation to said electrical parameter if said parameter remains the same during successive activations of said positive feedback loop.

14. A highly sensitive translating circuit in accordance with claim 13 further comprising a pulsating power source and wherein said pulsating power source is said feedback control means.

15. The circuit according to claim 13 wherein the combination of said storage means and coupling circuit means delays application of a signal from said output circuit to said input of one stage for a period of time less than that between successive activations by said feedback control means.

16. The circuit according to claim 13 wherein the combination of said storage means and coupling circuit means delays application of a signal from said output circuit to said input of one stage for a period of time substantially greater than that between successive activations by said feedback control means.

17. A highly sensitive signal translating circuit comprising
an amplifier including
an input circuit for receiving an electrical parameter to be sensed, and
a plurality of stages including an output stage for supplying a response indicative of said electrical parameter;
a positive feedback loop coupled to said amplifier for regeneratively driving the same into a saturated state related to said electrical parameter when activated;
feedback control means coupled to said positive feedback loop for periodically activating and impairing the regeneration of said feedback loop over successive time intervals short compared with said electrical parameter;
first and second signal storage means coupled to said output stage for storing a signal related to the saturated state of said amplifier;
first circuit means for coupling a signal from said first storage means to the input of one stage of said amplifier in aiding relation to the portion of said electrical parameter causing said signal, and
second circuit means for coupling a signal from said second storage means to the input of one stage of said amplifier in opposing relation to the portion of said electrical parameter causing said signal.

18. The circuit according to claim 17 wherein the time delay provided by said first circuit means and first storage means for said aiding signal is different from the time delay provided by said second circuit means and second storage means for said opposing signal.

19. The circuit according to claim 18 wherein the time delay for said aiding signal is less than that between successive activations by said feedback control means and the time delay for said opposing signal is substantially greater than that between successive activations.

20. The circuit according to claim 18 wherein the time delay for said aiding signal is substantially greater than that between successive activations by said feedback control means and the time delay for said opposing signal is less than that between successive activations.

21. The circuit according to claim 18 wherein the magnitudes of the aiding and opposing signals are different.

22. The circuit according to claim 21 wherein said aiding signal is larger than said opposing signal.

23. The circuit according to claim 21 wherein said opposing signal is larger than said aiding signal.

24. The circuit according to claim 18 wherein said aiding signal is applied during the operating cycle of said feedback control means and wherein said opposing signal is of a larger magnitude and applied after a time delay greater than said interval.

25. A highly sensitive signal translating circuit comprising
an amplifier including
an input circuit for receiving an electrical parameter to be sensed, and
an output circuit for supplying a response indicative of said electrical parameter;
positive feedback means included in said amplifier for driving said amplifier into a saturated state related to said electrical parameter when activated;
a pulsating source of power coupled to said amplifier and feedback circuit for periodically activating said positive feedback circuit and said amplifier so that said electrical parameter is incrementally sensed during successive activations, and
the saturated state of said amplifier resulting from successive activations of said feedback circuit is functionally related to said electrical parameter;
signal storage means being connected to said output circuit for storing a signal related to the saturated state of said amplifier; and
circuit means for coupling said signal storage means to said amplifier to bias the same in accordance with the saturated state resulting during a previous activation of said feedback circuit.

26. A highly sensitive translating circuit in accordance with claim 25 wherein said pulsating source of power is an unfiltered full-wave power supply.

27. A circuit according to claim 25 in which said amplifier comprises a pair of transitor stages and wherein said positive feedback means comprises a common emitter interconnecting circuit.

28. A radiant energy responsive translating circuit comprising
means providing an electrical parameter which varies in accordance with ambient radiant energy conditions;
an amplifier including
an input circuit for receiving said electrical parameter to be sensed,
an output circuit for supplying a response indicative of said electrical parameter, and
at least one stage between said input circuit and said output circuit;
a positive feedback loop coupled to said amplifier for regeneratively driving the same into a saturated state related to said electrical parameter when activated;
a feedback control means coupled to said positive feedback loop for periodically activating and impairing the regeneration of said feedback loop over successive time intervals short compared with said electrical parameter;
signal storage means being coupled to said output circuit for storing a signal related to the saturated state of said amplifier; and
circuit means for coupling said signal storage means to the input of one stage in said amplifier to bias said amplifier in accordance with a saturated state resulting during a previous activation of said feedback circuit.

29. A temperature responsive translating circuit comprising
means providing an electrical parameter which varies in accordance with ambient thermal energy conditions;
an amplifier including
an input circuit for receiving said electrical parameter to be sensed,
an output circuit for supplying a response indicative of said electrical parameter, and
at least one stage between said input circuit and said output circuit;
a positive feedback loop coupled to said amplifier for regeneratively driving the same into a saturated state related to said electrical parameter when activated;
a feedback control means coupled to said positive feedback loop for periodically activating and impairing the regeneration of said feedback loop over successive time intervals short compared with said electrical parameter;
signal storage means being coupled to said output circuit for storing a signal related to the saturated state of said amplifier; and
circuit means for coupling said signal storage means to the input of one stage in said amplifier to bias said amplifier in accordance with a saturated state resulting during a previous activation of said feedback circuit.

30. A highly sensitive signal translating circuit comprising
an amplifier including an input circuit for receiving an electrical parameter to be sensed, an output circuit for supplying a response indicative of said electrical parameter, and at least one stage between said input circuit and said output circuit;

a positive feedback loop coupled to said amplifier for regeneratively driving the same into a saturated state related to said electrical parameter when activated;

a feedback control means coupled to said positive feedback loop for periodically activating and impairing the regeneration of said feedback loop over successive time intervals short compared with said electrical parameter;

signal storage means including a capacitor being coupled to said output circuit for storing a signal related to the saturated state of said amplifier;

circuit means for coupling said signal storage means to the input of one stage in said amplifier to bias said amplifier in accordance with a saturated state resulting during a previous activation of said feedback circuit; and shunt circuit means connected across said capacitor for periodically discharging said capacitor in said signal storage means.

31. The circuit according to claim 30 wherein said signal storage means comprises a capacitor, and said shunt circuit means is a transistor connected across said capacitor and rendered conductive during every other activation by said feedback control means.

References Cited by the Examiner

UNITED STATES PATENTS

| | | | |
|---|---|---|---|
| 2,828,450 | 3/1958 | Pinckaers | 330—26 XR |
| 2,986,707 | 5/1961 | Blecher | 330—112 X |
| 3,005,915 | 10/1961 | White et al. | 330—26 X |
| 3,011,129 | 11/1961 | Magleby et al. | 328—73 X |
| 3,106,684 | 10/1963 | Luik | 330—112 X |
| 3,182,268 | 5/1965 | Burwen | 330—16 X |

ROY LAKE, *Primary Examiner.*

R. P. KANANEN, *Assistant Examiner.*